US006676263B2

(12) United States Patent
Winston

(10) Patent No.: US 6,676,263 B2
(45) Date of Patent: Jan. 13, 2004

(54) PERFORMANCE IMPROVEMENTS OF SYMMETRY-BREAKING REFLECTOR STRUCTURES IN NONIMAGING DEVICES

(75) Inventor: Roland Winston, Chicago, IL (US)

(73) Assignee: The University of Chicago, Chicago, IL (US)

(*) Notice: Subject to any disclaimer, the term of this patent is extended or adjusted under 35 U.S.C. 154(b) by 0 days.

(21) Appl. No.: 10/212,010

(22) Filed: Aug. 1, 2002

(65) Prior Publication Data
US 2003/0081333 A1 May 1, 2003

Related U.S. Application Data

(63) Continuation-in-part of application No. 09/875,820, filed on Jun. 6, 2001, now Pat. No. 6,467,916, which is a continuation of application No. 09/559,623, filed on Apr. 27, 2000, now abandoned, which is a continuation of application No. 09/122,136, filed on Jul. 24, 1998, now abandoned.
(60) Provisional application No. 60/309,439, filed on Aug. 1, 2001, and provisional application No. 60/053,764, filed on Jul. 25, 1997.

(51) Int. Cl.[7] .................................................. G02B 5/10
(52) U.S. Cl. ........................ 359/853; 359/869; 359/900; 126/684
(58) Field of Search ................................. 359/850, 851, 359/852, 853, 867, 869; 126/684, 690, 692, 694, 695, 702

(56) References Cited

U.S. PATENT DOCUMENTS

| | | | | |
|---|---|---|---|---|
| 4,024,852 A | * | 5/1977 | L'Esperance et al. | 126/646 |
| 4,120,565 A | * | 10/1978 | Rabl et al. | 359/836 |
| 4,432,345 A | * | 2/1984 | McIntire | 126/694 |
| 4,667,112 A | * | 5/1987 | Grossman | 250/503.1 |
| 5,921,667 A | * | 7/1999 | Raby et al. | 362/346 |

* cited by examiner

Primary Examiner—Mark A. Robinson
(74) Attorney, Agent, or Firm—Michael D. Rechtin; Foley & Lardner

(57) ABSTRACT

A structure and method for providing a broken symmetry reflector structure for a solar concentrator device. The component of the optical direction vector along the symmetry axis is conserved for all rays propagated through a translationally symmetric optical device. This quantity, referred to as the translational skew invariant, is conserved in rotationally symmetric optical systems. Performance limits for translationally symmetric nonimaging optical devices are derived from the distributions of the translational skew invariant for the optical source and for the target to which flux is to be transferred. A numerically optimized non-tracking solar concentrator utilizing symmetry-breaking reflector structures can overcome the performance limits associated with translational symmetry.

1 Claim, 38 Drawing Sheets

—— Source
- - - - Target

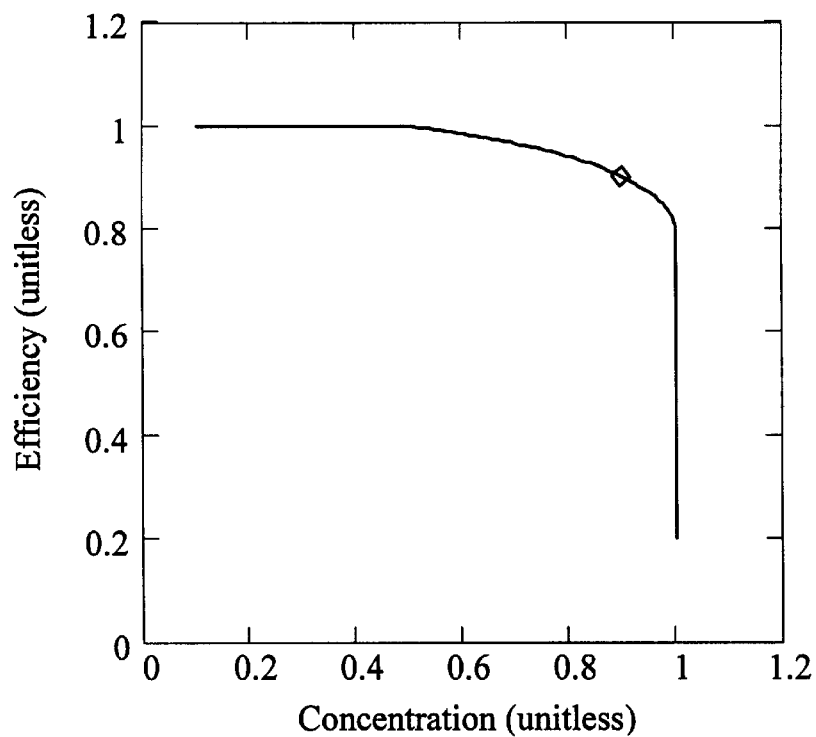
FIG. 7
FIG. 8
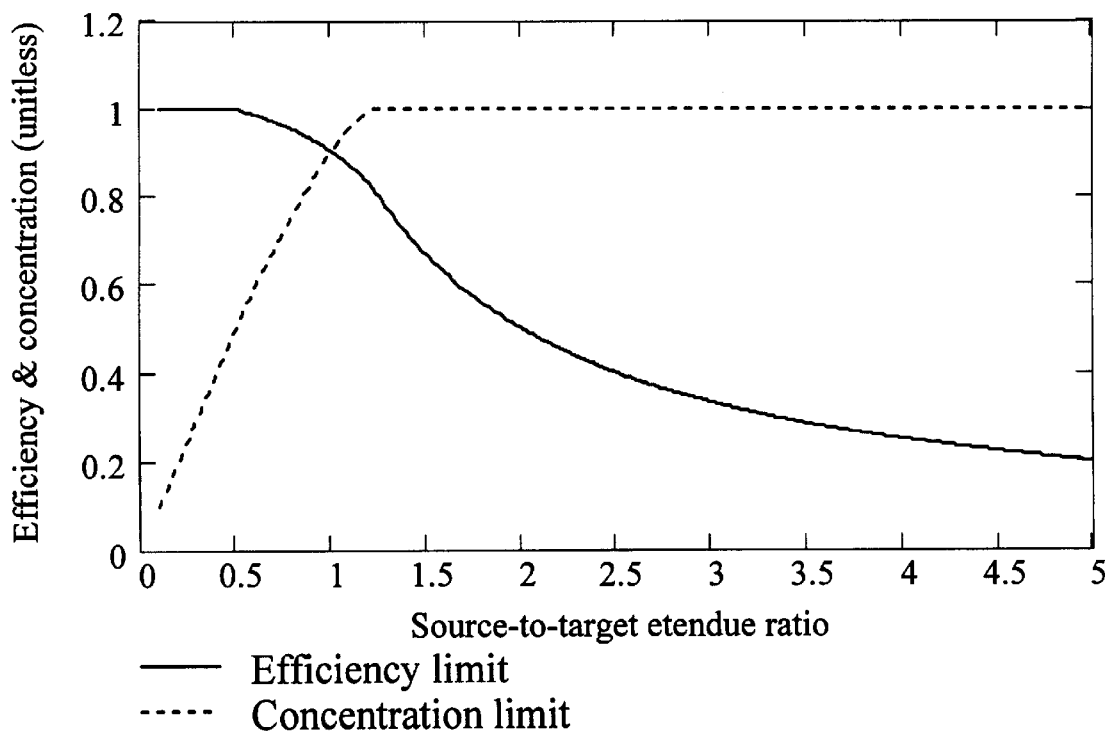
—— Efficiency limit
---- Concentration limit

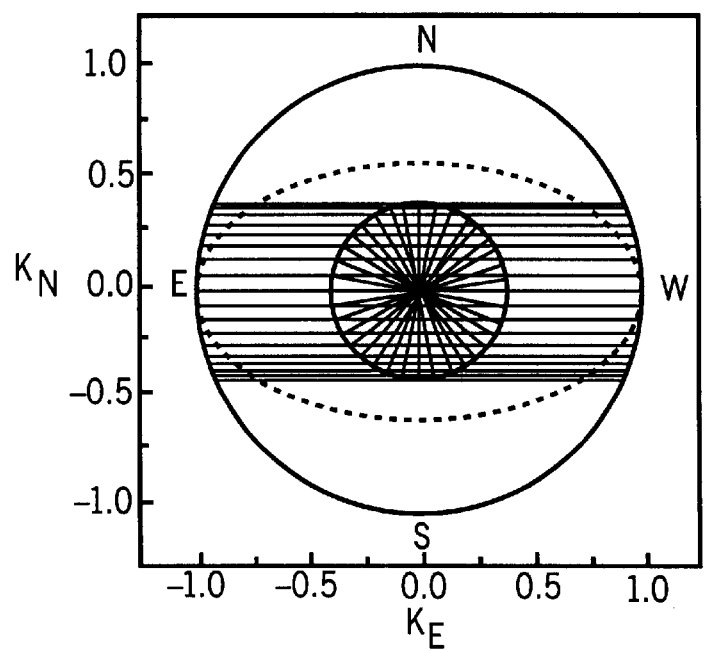
FIG. 44
FIG. 45
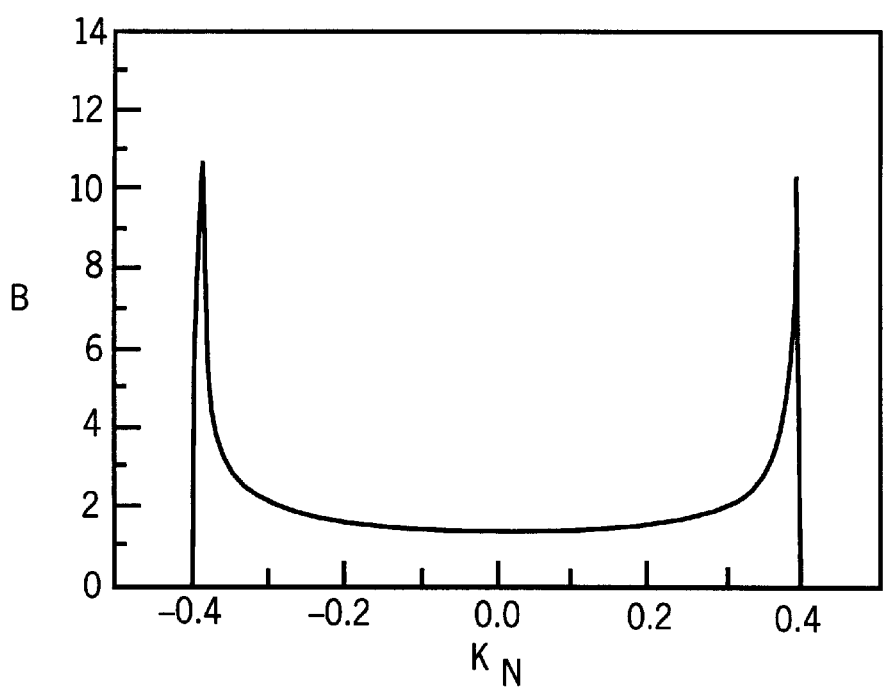

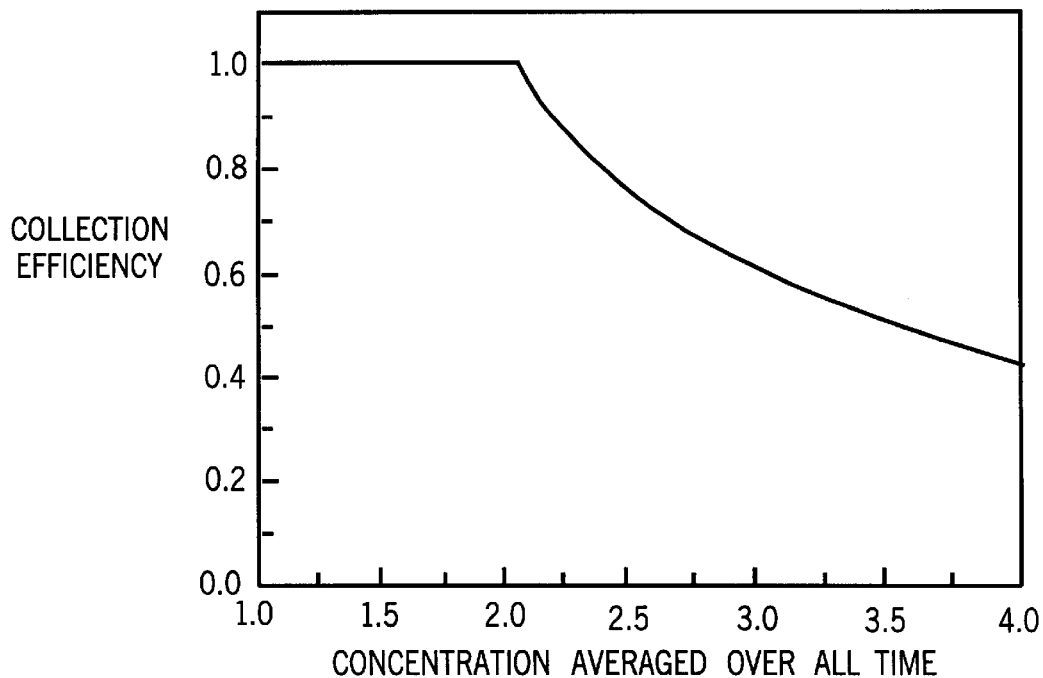
FIG. 46
FIG. 47
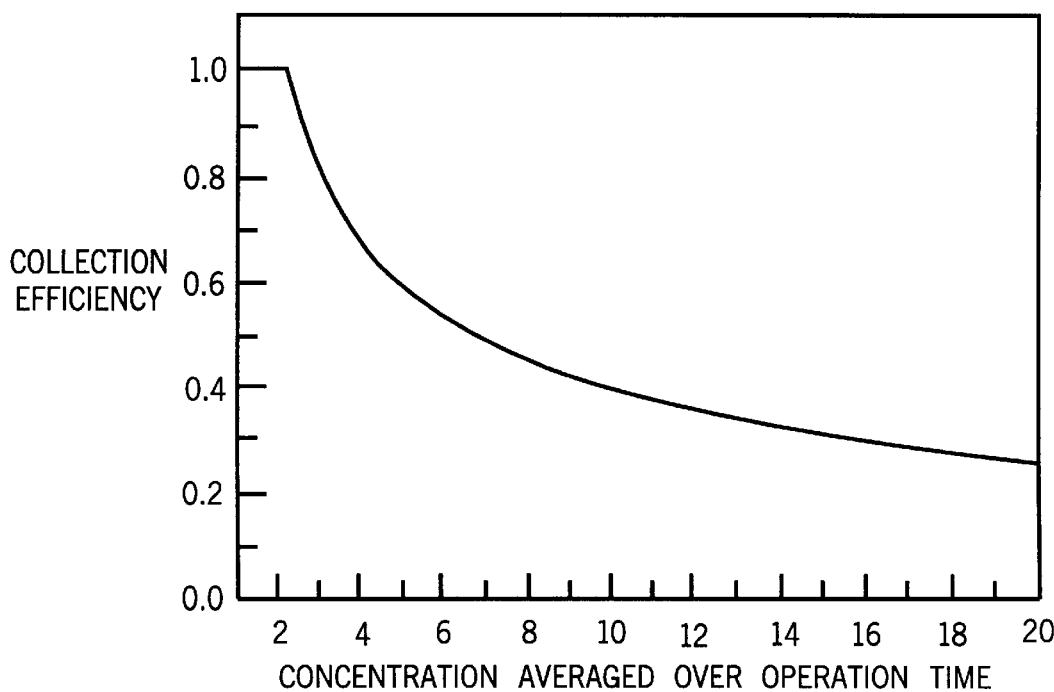

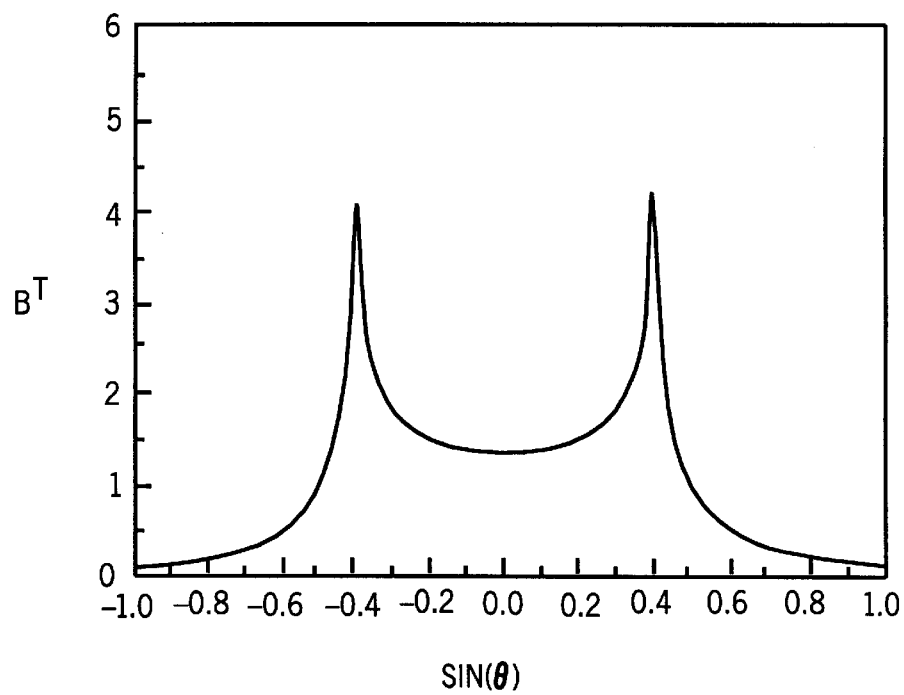
FIG. 48
FIG. 49
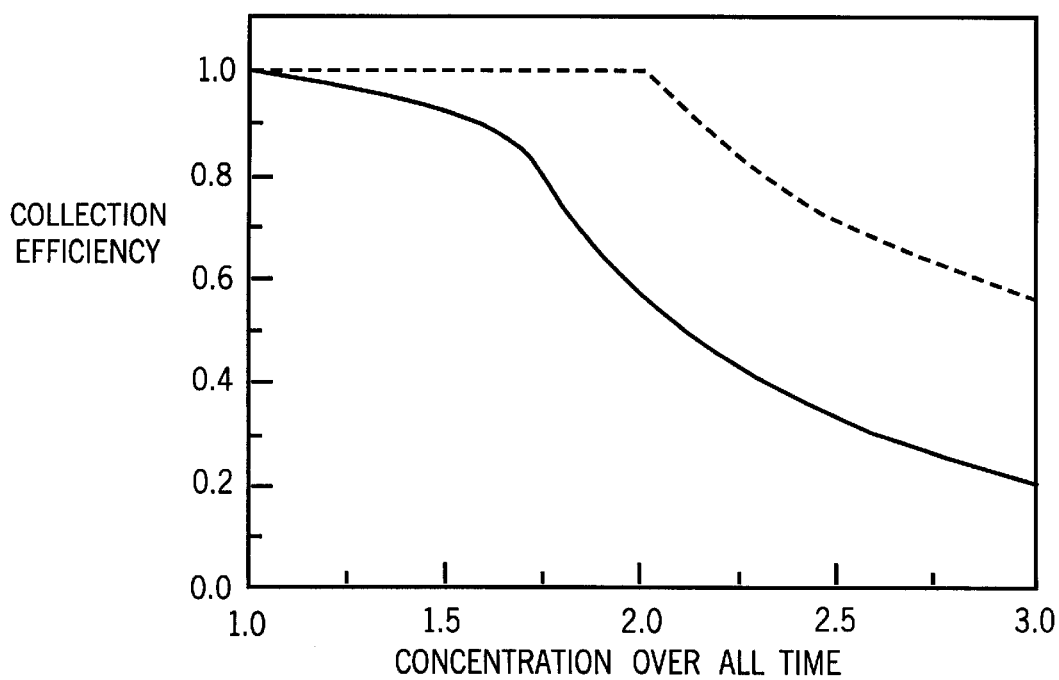

PERFORMANCE IMPROVEMENTS OF SYMMETRY-BREAKING REFLECTOR STRUCTURES IN NONIMAGING DEVICES

The present application claims priority to provisional U.S. patent application Ser. No. 60/309,439 filed Aug. 1, 2001. The present application is also a continuation-in-part of U.S. application Ser. No. 09/875,820, filed Jun. 6, 2001 now U.S. Pat. No. 6,467,916, which is a continuation of U.S. application Ser. No. 09/559,623, filed Apr. 27, 2000 now abondoned, which is a continuation of U.S. application Ser. No. 09/122,136 now abondoned, filed Jul. 24, 1998, which claims priority to U.S. Provisional Application Serial No. 60/053,764, filed Jul. 25, 1997.

This work was made with support from the US Department of Energy under Grant No. DE-FG0287ER13726.

FIELD OF THE INVENTION

The present invention relates generally to an optimized non-tracking solar concentrator. More particularly, the present invention relates to a numerically optimized non-tracking solar concentrator utilizing symmetry-breaking surface and reflector structure.

BACKGROUND OF THE INVENTION

It has been conventionally understood that solar concentrators placed in an east-west arrangement will receive light over a longer period of time and are generally more efficient than concentrators oriented in a north-south arrangement of the same size and shape. There are several reasons, however, why it can be beneficial to place solar concentrators in a north-south arrangement as opposed to an east-west arrangement.

Some advantages to a north-south orientation for concentrators arise, for example, from the collector plane being tilted in elevation, and thus a north-south arrangement allows a heat pipe to function properly since the heat pipe condenser, which is at the end of a receiver tube, must be located above the rest of the tube to enable gravitational forces to apply. In an east-west orientation, however, the tubes are horizontal and gravity does not assist the fluid return. Additionally, the connecting piping in a north-south arrangement is substantially horizontal, which is more efficient and less costly to construct than the substantially vertical arrangement required for an east-west oriented concentrator. Furthermore, north-south oriented collectors with CPC (compound parabolic concentrator) reflectors are somewhat self-cleaning with rainfall. As a result, glazing covers are often not necessary. With east-west oriented collectors, however, dirt and debris can accumulate, requiring that glazers be included. There has therefore been a desire to increase the performance characteristics of north-south collectors to take advantage of these beneficial qualities. Unfortunately, however, the nature of translationally symmetrical solar concentrators has resulted in north-south solar concentrators being very limited in performance for the reasons described herein below.

Using a conventional geometrical-optics approximation, the flux-transfer efficiency of passive optical systems—such as lenses, reflectors, and combinations thereof—is limited by the principle of étendue conservation. For rotationally symmetric optical systems a further, more stringent limitation on flux-transfer efficiency is imposed by the fact that the skew invariant of each ray propagating through such systems is conserved. This performance limitation can, however, be overcome by breaking the symmetry of the optical system.

Translationally symmetric optical systems are subject to a performance limitation analogous to the limitation imposed by the skew invariant on rotationally symmetric systems. The performance limitations imposed on nonimaging optical systems by rotational and translational symmetry are a consequence of the well known Noether's theorem, which relates symmetry to conservation laws.

A translationally symmetric nonimaging device is a nonimaging optical system for which all refractive and reflective optical surfaces have surface normal vectors that are everywhere perpendicular to a single Cartesian coordinate axis, referred to as the symmetry axis. In an optical ray incident on a translationally symmetric optical surface, the symmetry axis is assumed to be the z-axis of a Cartesian x,y,z-coordinate system. The incident ray is assumed to propagate through a medium of refractive index $n_0$. The incident optical direction vector is defined as:

$$\vec{S}_0 = n_0 \vec{Q}_0, \qquad (1)$$

where $\vec{Q}_0$ is a unit vector pointing in the propagation direction of the incident ray. It is well known in the art that the component of the optical direction vector along the symmetry axis is conserved for all rays propagating through a translationally symmetric optical system. This follows from the vector formulation of the laws of reflection and refraction, in which the optical direction vector of a ray reflected or refracted by the optical surface is:

$$\vec{S}_1 = \vec{S}_0 + \Gamma \vec{M}_1, \qquad (2)$$

where $\vec{M}_1$ is the unit vector normal to the surface at the point of intersection of the incident ray with the surface. The formula for the quantity $\Gamma$ is:

$$\Gamma = 2n_0 \cos(I) \qquad (3)$$

for reflection and:

$$\Gamma = -n_0 \cos(I) + n_1 \sqrt{\left(\frac{n_0}{n_1}\right)^2 \cos^2(I) - \left(\frac{n_0}{n_1}\right)^2 + 1} \qquad (4)$$

for refraction of the ray into a material of refractive index $n_1$. In equations (3) and (4) for $\Gamma$, the quantity I is the angle of incidence of the ray relative to the surface-normal vector. The unit vector $\vec{M}_1$ in the above formulation is, by definition, perpendicular to the z axis, meaning that its z-component equals zero. From Eq. (2), it can be determined that the incident and reflected (or refracted) optical direction vectors—$\vec{S}_0$ and $\vec{S}_1$—must have the same z-component. Since the z-axis is the symmetry axis, the component of the optical direction vector along the symmetry axis is invariant for any ray propagated through a translationally symmetric optical system. This invariant component of the optical direction vector is referred to as the translational skew invariant or the translational skewness. The fact that a translationally symmetric nonimaging system cannot alter the translational skew invariant, which is also referred to as skewness or the skew invariant, places a fundamental limitation on the flux-transfer efficiency achievable by such a system.

Translational skewness is a unitless quantity with an absolute value less than or equal to the refractive index. Translational skewness can be negative or positive depending on the ray direction relative to the z-axis. A ray that is perpendicular to the symmetry axis always has zero translational skewness. The only requirement for the translational skewness to be an invariant quantity is that the optical system be translationally symmetric. In particular, there is no requirement that either the radiation source or the target to which flux is to be transferred be symmetric.

Just as the rotational skewness of a ray is analogous to angular momentum measured relative to the symmetry axis of a rotationally symmetric optical system, translational skewness is analogous to the component of linear momentum along the symmetry axis of a translationally symmetric optical system. For example, in a small unit-velocity particle of mass equal to the index of refraction traveling along the ray path, the linear-momentum component of the particle along the translational symmetry axis is equal to the translational skewness of the ray. If the translational skewness of each individual ray entering an optical system is conserved, then the complete distribution of translational skewness for all emitted rays must also be conserved. As in the case of the rotational skewness, this places a much stronger condition on achievable performance than the conservation of phase-space volume, often referred to as étendue, which is a scalar quantity.

It has been held as conventional wisdom that the use of translationally symmetrical optical concentrators result in the most efficient energy collection. Using a translationally symmetrical, non-tracking concentrator, particularly in a north-south arrangement, is still severely limited in the amount of light that is collected during the day.

SUMMARY OF THE INVENTION

It is therefore an object of the invention to provide an improved non-tracking solar concentrator that can overcome the performance limitations associated with translational symmetry.

It is another object of the invention to provide an improved non-tracking solar concentrator that provides an increase in efficiency and concentration relative to an ideal translationally symmetric, non-tracking solar concentrator.

It is still another object of the invention to provide an improved non-tracking solar concentrator that increases the amount of time that light is collected during the day.

It is yet another object of the invention to provide an improved non-tracking solar concentrator that is arranged in a substantially north-south and inclined position.

In accordance with the above objects, a non-tracking solar concentrator includes a symmetry-breaking reflector. The symmetry-breaking reflector, which can exist in the form of ridges, indentations, facet arrangements, impressions, particle dispersions in a volume or other features, helps the concentrators overcome the performance limitations associated with translational symmetrical concentrators, resulting in an increase in performance relative to an ideal translationally symmetrical concentrator despite the conventional belief in the art that translationally non-symmetrical concentrators will provide inferior performance characteristics. Optimally positioned breaks in symmetry have substantial advantages such as, for example, assisting the collector in collecting light for a longer period of time during the day.

BRIEF DESCRIPTION OF THE DRAWINGS

FIG. 7 is a plot of the efficiency limit as a function of the concentration limit for translationally symmetric nonimaging devices that transfer flux to a Lambertian target from a source having fixed latitudinal cutoffs parallel to the symmetry axis, wherein the angular half width of the source is $\Theta_0=23.4°$;

FIG. 8 is a plot of the efficiency and concentration limits as a function of the source-to-target étendue ratio for translationally symmetric nonimaging devices that transfer flux to a Lambertian target from a source having fixed latitudinal cutoffs parallel to the symmetry axis, wherein the angular half width of the source is $\Theta_0=23.45°$;

FIG. 44 is a plot of direction vectors of the sun;

FIG. 45 is a plot of relative radiance of the sun as a function of the direction coefficient;

FIG. 46 is a plot of collection efficiency of an ideal stationary concentrator as a function of its concentration averaged over all time;

FIG. 47 is a plot of collection efficiency of an ideal stationary concentrator as a function of its concentration averaged over operation time;

FIG. 48 is a plot of brightness distribution over projected incidence angle appropriate for a trough-type concentrator relative to uniform sky of equal irradiance; and FIG. 49 is a plot of collection efficiency of an ideal stationary trough-type concentrator as function of its concentration averaged over all time.

DETAILED DESCRIPTION OF THE INVENTION

Figure 1:
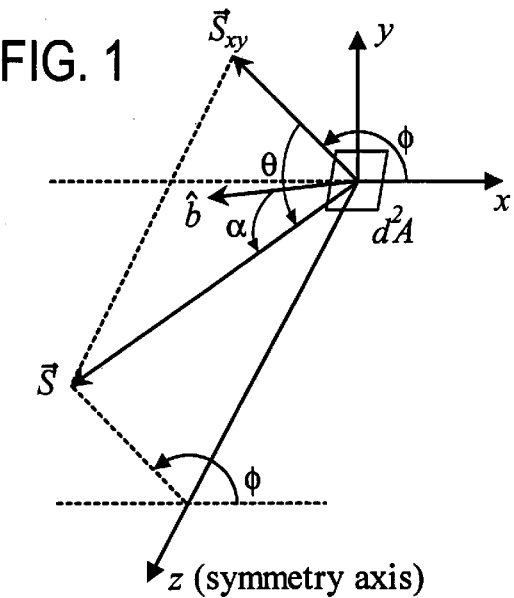
FIG. 1 is a depiction of the geometry for calculation of the translational skewness distribution of a source or target.

In order to illustrate embodiments of the invention, an explanation is provided to generally describe the methodology and function for the systematic procedure of the invention and then the stepwise analytical methodology is presented in detail. Although the manner in which the phenomena are described is one rigorous approach which explains the operation of the invention for those skilled in the art, other conventional mathematical and theoretical explanations can also be used to describe similar results which characterize embodiments of the invention. The invention is therefore not limited to the description of its operation by the following illustrative explanations.

In a translationally symmetric optical system having the z-axis as its symmetry axis, the skewness of any given ray is defined as the z-component, $S_z$, of the ray's optical direction vector. In the case where the optical system transfers flux from some extended optical source to an extended target, $d\xi_{src}(S_z)$ refers to the differential source étendue as a function of skewness contributed by all source flux having skewness values between $S_z$ and $S_z+dS_z$. Similarly, $d\xi_{trg}(S_z)$ refers to the available differential target étendue in the same skewness interval. Since the skewness cannot be altered by the symmetric optical system, it is impossible to transfer étendue from one skewness interval on the source to a different skewness interval on the target. Therefore the principle of étendue conservation applies simultaneously to each differential skewness interval. The following two constraints are therefore placed on the differential skewness $d\xi_{tran}(S_z)$ transferred from the source to the target within any given differential skewness interval:

$$d\xi_{tran}(S_z) \leq d\xi_{src}(S_z) \qquad (5)$$

$$d\xi_{tran}(S_z) \leq d\xi_{trg}(S_z). \qquad (6)$$

Eq. (5) is a statement of the fact that the optical system cannot transfer more étendue to the target than is available in the source for any given differential skewness interval. Eq. (6) is a statement of the fact that the optical system cannot transfer to the target more source étendue than can be accommodated by the available target phase-space volume for any given differential skewness interval. It is convenient to combine the above two constraints into a single constraint:

$$\frac{d\xi_{tran}(S_z)}{dS_z} \leq \min\left[\frac{d\xi_{src}(S_z)}{dS_z}, \frac{d\xi_{trg}(S_z)}{dS_z}\right], \qquad (7)$$

where the right and left sides have been divided by $dS_z$ in order to express the inequality as a constraint on the derivative of étendue with respect to skewness. This étendue derivative is a function of skewness as the skewness distribution. The quantities $d\xi_{src}(S_z)/dS_z$, $d\xi_{trg}(S_z)/dS_z$, and $d\xi_{tran}(S_z)/dS_z$ are the skewness distributions of the source, target, and transferred source-to-target flux, respectively. It should be emphasized that the inequality of Eq. (7) only applies for translationally symmetric optical systems.

In skewness intervals for which the $d\xi_{src}(S_z)/dS_z < d\xi_{trg}(S_z)/dS_z$, there is insufficient source étendue to completely fill the available target étendue. In such skewness regions the radiation must be diluted, since some of the target étendue remains unfilled. In skewness intervals for which $d\xi_{trg}(S_z)/dS_z < d\xi_{src}(S_z)/dS_z$, there is insufficient target étendue to accommodate the source étendue, so that losses inevitably occur. It is only when $d\xi_{trg}(S_z)/dS_z = d\xi_{src}(S_z)/dS_z$, over the entire range of allowable skewness values that the possibility exists of avoiding both losses and dilution using a translationally symmetric optical system.

The total étendue is obtained by integrating the skewness distribution over the entire skewness interval. It follows from Eq. (7) that the upper limit on the total étendue that can be transferred from the source to the target is:

$$\xi_{tran,max} = \int_{S_{min}}^{S_{max}} \min\left[\frac{d\xi_{src}(S_z)}{dS_z}, \frac{d\xi_{trg}(S_z)}{dS_z}\right]dS_z, \qquad (8)$$

where $S_{min}$ and $S_{max}$ are the minimum and maximum skewness values for which the integrand is non-zero. The efficiency $\eta$ is defined as the ratio of the transferred étendue to the total source étendue. Similarly, the concentration C is defined as the ratio of the transferred étendue to the total target étendue. The maximum efficiency achievable by a translationally symmetric optical system is therefore:

$$\eta_{max} = \frac{\int_{S_{min}}^{S_{max}} \min\left[\frac{d\xi_{src}(S_z)}{dS_z}, \frac{d\xi_{trg}(S_z)}{dS_z}\right]dS_z}{\int_{S_{src,min}}^{S_{src,max}} \frac{d\xi_{src}(S_z)}{dS_z}dS_z}, \qquad (9)$$

where $S_{src,min}$ and $S_{src,max}$ are the minimum and maximum skewness values for which the source's skewness distribution is non-zero. The maximum achievable concentration is given by the formula:

$$C_{min} = \frac{\int_{S_{min}}^{S_{max}} \min\left[\frac{d\xi_{src}(S_z)}{dS_z}, \frac{d\xi_{trg}(S_z)}{dS_z}\right]dS_z}{\int_{S_{trg,min}}^{S_{trg,max}} \frac{d\xi_{trg}(S_z)}{dS_z}dS_z}, \qquad (10)$$

where $S_{trg,min}$ and $S_{trg,max}$ are the minimum and maximum skewness values for which the target's skewness distribution is non-zero.

Since its value is always less than or equal to unity, the definition of the concentration C differs from the conventional usage of this term in nonimaging optics. Rather, the quantity C constitutes a measure of the degree to which the target's phase-space volume has been filled by flux from the source. When C=1, the phase space of the target is completely filled by flux transferred from the source. When C=0, on the other hand, no flux at all is transferred from the source to any portion of the target's phase space.

Equations (9) and (10) provide a means of computing the upper limits on the transfer of étendue from a source to a target. For homogeneous sources and targets, these efficiency and concentration limits also apply to the transfer of flux. For inhomogeneous sources and targets, on the other hand, the formulas for the flux-transfer limits are not the same as the formulas for the étendue-transfer limits. The flux-transfer limits in the case of a translationally symmetric optical system with an inhomogeneous source and target are obtained by replacing the rotational skew invariant by the translational skew invariant in the corresponding flux-transfer-limit formulas for rotationally symmetric optics.

In light of the above, an expression for calculating the skewness distribution can be determined. In FIG. 1 a differential patch of area $d^2A$ on the surface of an extended source or target is depicted. The unit vector normal to the patch's surface is designated as $\hat{b}$. As long as the z-axis remains parallel to the symmetry axis, the Cartesian x,y,z-coordinate system can be reoriented without a loss of generality. It is convenient to place the origin at the center of the patch and to orient the x- and y-axes such that the unit surface-normal vector $\hat{b}$ lies in the y,z-plane. $\vec{S}_{xy}$ is defined as the projection of the optical direction vector $\vec{S}$ onto the x,y-plane. The skewness $S_z$ can be expressed as:

$$S_z = n\sin(\theta) \qquad (11)$$

where n is the refractive index and $\theta$ is the angle between the vectors $\vec{S}$ and $\vec{S}_z$. The differential étendue is given by:

$$d^4\xi = n^2 d^2\Omega d^2A \cos(\alpha), \qquad (12)$$

where $\alpha$ is the angle between the vectors $\hat{b}$ and $\vec{S}$. The quantity $d^2\Omega$ in Eq. (12) is defined as the differential solid angle. This can be written in the form:

$$d^2\Omega = \cos(\theta)d\theta d\phi, \qquad (13)$$

where $\Phi$ is the angle between the vector $\vec{S}_{xy}$ and the x-axis. The cosine of $\alpha$ can be computed from the dot product of $\vec{S}$ and $\hat{b}$:

$$\cos(\alpha) = \frac{|\vec{S} \cdot \hat{b}|}{n}. \quad (14)$$

Using the fact that $\hat{b}$ lies in the y,z-plane, the dot product in Eq. (14) can be evaluated to obtain the formula:

$$\cos(\alpha) = \cos(\theta)\sin(\phi)\cos(\beta) + \sin(\theta)\sin(\beta), \quad (15)$$

where $\beta$ is the angle between $\hat{b}$ and the y-axis. The sign convention for $\beta$ is that it always has the same sign as the z-component of $\hat{b}$. Substitution of Eqs. (13) and (15) into Eq. (12) produces the result:

$$d^2\xi = n^2[\cos^2(\theta)\sin(\phi)\cos(\beta) + \cos(\theta)\sin(\theta)\sin(\beta)]d\theta d\phi d^2 A. \quad (16)$$

Taking the derivative of Eq. (11), it is determined that:

$$dS_z = n\cos(\theta)d\theta. \quad (17)$$

Since $\cos(\theta) = \sqrt{1 - \sin^2(\theta)}$, Eq. (11) permits one to express the cosine of $\theta$ in terms of the skewness:

$$\cos(\theta) = \sqrt{1 - \frac{S_z^2}{n^2}}. \quad (18)$$

The $\theta$ dependence in Eq. (16) can be converted into $S_z$-dependence through substitution of Eqs. (11), (17), and (18):

$$\frac{d^4\xi}{dS_z} = \left[\sqrt{n^2 - S_z^2}\sin(\phi)\cos(\beta) + S_z\sin(\beta)\right]d\phi d^2 A. \quad (19)$$

Integrating over the angle $\Phi$ and the total surface area, the desired expression for the skewness distribution is obtained as a function of the skewness:

$$\frac{d\xi(S_z)}{dS_z} = \int\int\left[\sqrt{n^2 - S_z^2}\sin(\phi)\cos(\beta) + S_z\sin(\beta)\right]d\phi d^2 A, \quad (20)$$

where the integrals are taken over all $\Phi$-values and regions of surface area within the phase-space volume. It should be noted that the limits on the $\Phi$-integral can be a function of both $S_z$ and position on the surface area. In addition, the angle $\beta$ can be a function of position on the surface area.

For the important special case of a translationally symmetric source or target having the same symmetry axis as the optical system, the skewness distribution can be expressed in a relatively simple form. Noting that $\alpha$ is the angle between the direction vector and the surface normal, that Eq. (12) can be rewritten as:

$$d^4\xi = n^2 d^2\Omega_p d^2 A, \quad (21)$$

where $\Omega_p$ is the projected solid angle:

$$\Omega_p = \Omega\cos(\alpha), \quad (22)$$

For a translationally symmetric source or target, the surface-normal vector $\hat{b}$ coincides with the y-axis, so that the projected solid angle becomes a projection of the solid angle onto the x,z-plane. The differential projected solid angle can therefore be expressed in terms of the x and z-components of the optical direction vector:

$$d^2\Omega_p = \frac{dS_x dS_z}{n^2}. \quad (23)$$

The factor of $n^2$ in the denominator of Eq. (23) is required to properly normalize the projected solid angle, since the optical direction vector is of length n. From Eqs. (21) and (23) the desired formula for the skewness distribution of a translationally symmetric source or target having the same symmetry axis as the optical system is determined:

$$\frac{d\xi(S_z)}{dS_z} = \int\int dS_x d^2 A. \quad (24)$$

For the general case of non-translationally-symmetric sources and targets, Eq. (20) can be rewritten in the form:

$$\frac{d\xi(S_z)}{dS_z} = \int\left[\cos(\beta)\int dS_x + S_z\sin(\beta)\int d\phi\right]d^2 A, \quad (25)$$

which reduces to Eq. (24) upon setting $\beta$ equal to zero.

The formulas derived above can also be applied to determine the skewness distributions for specific sources, such as the ones hereinafter. In each case it is assumed that the source is Lambertian over a particular angular region and zero outside that region. In addition, it is assumed that the angular distribution of emitted radiation is independent of position over the surface of the source, and that the source is translationally symmetric, with symmetry axis coincident with that of the optical system. To prevent emitted source flux from being reabsorbed by the source, the emitting surface is required to be convex. Each skewness distribution derived herein also applies in the case of an analogous translationally symmetric convex target, as long as the allowed angular region of absorption for the target is identical to the angular region of emission of the source for which the skewness distribution was derived.

Skewness Distribution for a Lambertian Source

Figure 2:
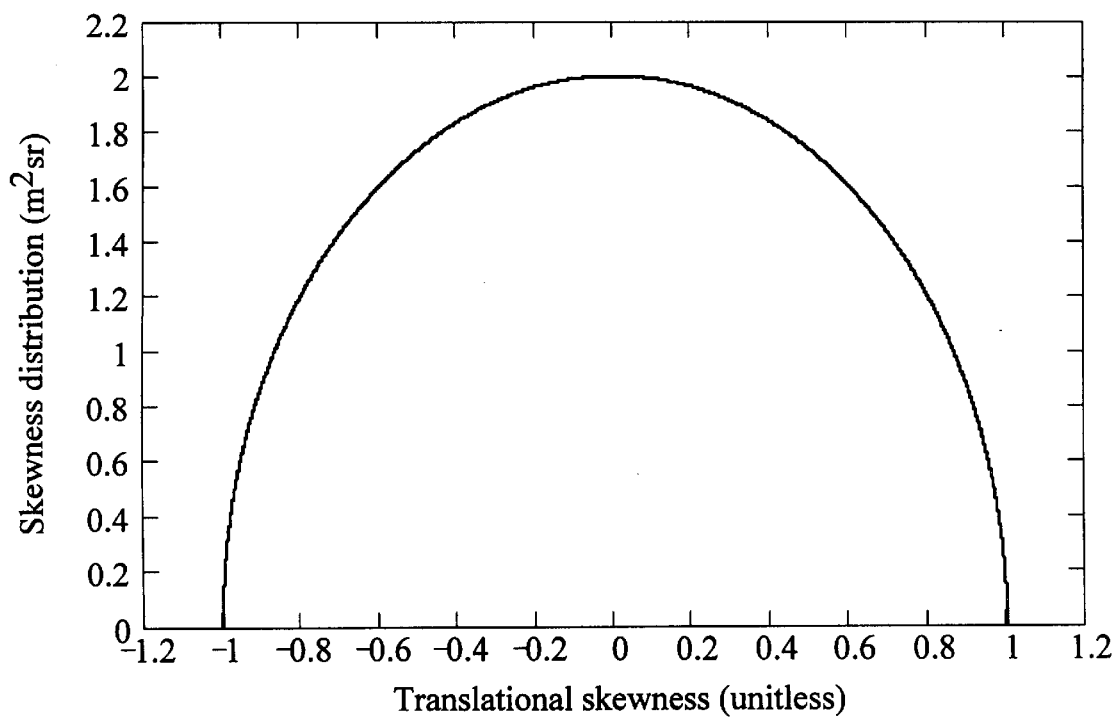
FIG. 2 is a depiction of a translational skewness distribution of a Lambertian source with 1 m² surface area in a medium of unit refractive index.

In one example, the skewness distribution is derived for the case of a source that is Lambertian for all possible emission directions. Due to the translational symmetry of the source, the surface-normal orientation angle $\beta$ equals zero over the entire surface area. The limits of the $\Phi$-integral in Eq. (20) are 0 to $\pi$ radians for all allowed values of $S_z$ and all positions on the surface. Eq. (20) therefore reduces to:

$$\frac{d\xi(S_z)}{dS_z} = \begin{cases} 2A_{tot}\sqrt{n^2 - S_z^2} & \text{when } |S_z| \leq n \\ 0 & \text{otherwise} \end{cases}, \quad (26)$$

where $A_{tot}$, is the total surface area of the source. A plot of this skewness distribution is provided in FIG. 2. By integrating the above skewness distribution over all allowed skewness values, the total étendue for this source is determined to be:

$$\xi_{tot} = \pi n^2 A_{tot}. \quad (27)$$

The skewness distribution of Eq. (26) can also be easily derived using Eq. (24) rather than Eq. (20). To do this, it is first noted that the projection onto the x,z-plane of the allowed optical direction vectors for this source is a circular region of radius n centered on the origin. Due to the circular geometry, the integration range for the $S_x$-integral in Eq. (24) will be from $-\sqrt{n^2 - S_z^2}$ to $\sqrt{n^2 + S_z^2}$, for $S_z$-values such that $|S_z| \leq n$. Thus the $S_x$-integral equals $2\sqrt{n^2 - S_z^2}$ for $|S_z| \leq n$.

For $n<|S_z|$ the $S_x$-integral equals zero, since these $S_z$-values are outside of the allowed circular region. Multiplying the $S_x$-integral by the total area-integral contribution of $A_{tot}$, we obtain Eq. (26).

Skewness Distribution for Fixed Longitudinal Cutoffs Parallel to Symmetry Axis

In an alternate example, a source is Lambertian within a fixed range of $\Phi$-values centered on the y,z-plane. As is apparent from FIG. 1, the angle $\Phi$ is analogous to longitude. This type of source is therefore defined as one having fixed longitudinal angular cutoffs. Also, since the set of optical direction vectors $\vec{S}$ having the same $\Phi$-value all lie in a plane passing through the z-axis, these longitudinal angular cutoffs are considered to be parallel to the symmetry axis. The $\Phi$-integration in Eq. (20) must now be performed over the range:

$$\frac{\pi}{2} - \phi_0 \le \phi \le \frac{\pi}{2} + \phi_0, \tag{28}$$

where $\Phi_0$ is the angular half width of the emitted flux distribution. Setting $\beta$ equal to zero in Eq. (20) and using the above range of $\Phi$-values, it is determined that:

$$\frac{d\xi(S_z)}{dS_z} = \begin{cases} 2A_{tot}\sin(\phi_0)\sqrt{n^2 - S_z^2} & \text{when } |S_z| \le n \\ 0 & \text{otherwise} \end{cases} \tag{29}$$

The total étendue in this case is $$\xi_{tot} = \pi n^2 A_{tot} \sin(\phi_0). \tag{30}$$

Comparing Eqs. (26) and (29), the skewness distributions for the Lambertian case and the fixed-longitudinal-angular-cutoff case are found to be identical as long as the following two conditions are met:

1) The indices of refraction for the two cases are equal, and
2) The surface area for the fixed-longitudinal-cutoff case divided by the surface area for the Lambertian case equals $1/\sin(\Phi_0)$.

The fact that the two skewness distributions match when the above two conditions are satisfied is consistent with the fact that both the translationally symmetric compound parabolic concentrator (CPC) and the translationally symmetric involute CPC are ideal concentrators capable of transferring all of the source phase space to the phase-space volume of an equal-étendue target, when the source has fixed longitudinal angular cutoffs as described herein. It is of interest to note that when the indices of refraction for the source and target are different, there is an inherent skewness mismatch between the Lambertian and fixed-longitudinal-angular-cutoff cases, meaning that a translationally symmetric concentrator cannot be ideal in this case.

Skewness Distribution for a Fixed Latitudinal Cutoffs Parallel to Symmetry Axis

A third example of a skewness distribution concerns a source that is Lambertian within a fixed angular band. However, emission over a particular band of latitudinal angles is considered, rather than the longitudinal band analyzed in the previous subsection. $\Theta$ is defined as the latitudinal angle between the optical direction vector and the y,z-plane, where the y,z-plane is analogous to the equatorial plane. The sign of $\Theta$ is assumed to equal the sign of the x-component of the optical direction vector. In this example, the angular band is assumed to be centered on the y,z-plane, with half width $\Theta_0$. Since the set of optical direction vectors $\vec{S}$ having the same $\Theta$-value all lie in a plane parallel to the z-axis, the latitudinal angular cutoffs are considered to be parallel to the symmetry axis.

Due to the assumed latitudinal angular cutoffs, the source emits radiation only for $\vec{S}$-values within the angular interval:

$$|\Theta| \le \Theta_0. \tag{31}$$

Figure 3:
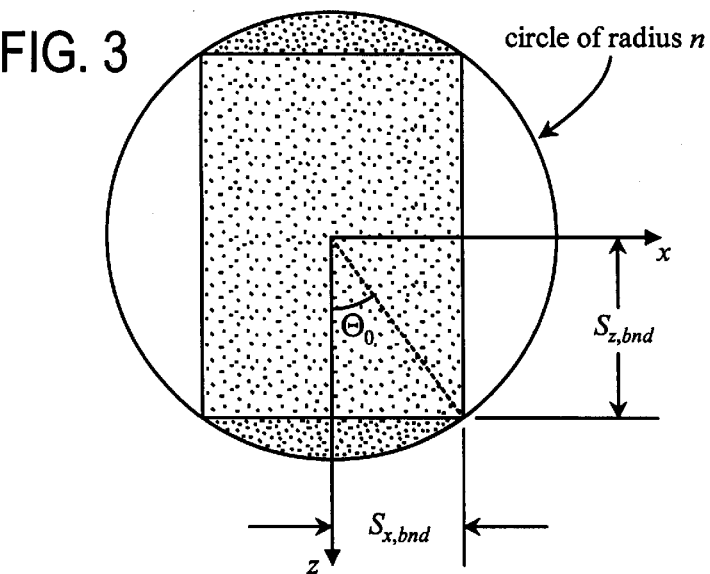
FIG. 3 is a projection onto the x,z-plane of the allowed optical direction vectors of a source having fixed latitudinal angular cutoffs parallel to the symmetry axis and centered on the y,z-plane.

The shaded region in FIG. 3 depicts the projection onto the x,z-plane of the allowed optical direction vectors within this angular band. The two straight edges of this projected angular band intersect the circle of radius n at skewness values of $\pm S_{z,bnd}$, where:

$$S_{z,bnd} = n \cos(\Theta_0). \tag{32}$$

The two darker-shaded regions in FIG. 3 represent the subset of the projected angular band for which the skewness values have magnitude greater than or equal to $S_{z,bnd}$. The upper and lower limits of the allowed values of $S_x$ in these two regions occur on the perimeter of the circle. From the equation of this circle, we find that these upper and lower limits as a function of $S_z$ are $$\pm\sqrt{n^2 - S_z^2}.$$

Incorporating these limits into the $S_x$-integral of Eq. (24), it is determined that:

$$\frac{d\xi(S_z)}{dS_z} = 2A_{tot}\sqrt{n^2 - S_z^2} \quad \text{when } S_{z,bnd} \le |S_z| \le n. \tag{33}$$

The rectangular, lighter-shaded region of the projected angular band of FIG. 3 represents the portion of the band having skewness values of magnitude less than $S_{z,bnd}$. The upper and lower $S_x$-limits within this rectangular region are simply $\pm S_{x,bnd}$, where $S_{x,bnd}$ is the half width of the rectangle in the x-direction:

$$S_{x,bnd} = \sqrt{n^2 - S_{z,bnd}^2}. \tag{34}$$

Using these limits, Eq. (34) gives the formula:

$$\frac{d\xi(S_z)}{dS_z} = 2A_{tot}\sqrt{n^2 - S_{z,bnd}^2} \quad \text{when } |S_z| \le S_{z,bnd}. \tag{35}$$

Combining Eqs. (33) and (35), along with the fact that the skewness distribution must equal zero for skewness values greater than n, it is determined that the skewness distribution over the entire range of skewness values is of the form:

$$\frac{d\xi(S_z)}{dS_z} = \begin{cases} 2A_{tot}\sqrt{n^2 - S_{z,bnd}^2} & \text{when } |S_z| < S_{z,bnd} \\ 2A_{tot}\sqrt{n^2 - S_z^2} & \text{when } S_{z,bnd} \le |S_z| \le n \\ 0 & \text{otherwise} \end{cases} \tag{36}$$

Figure 4:
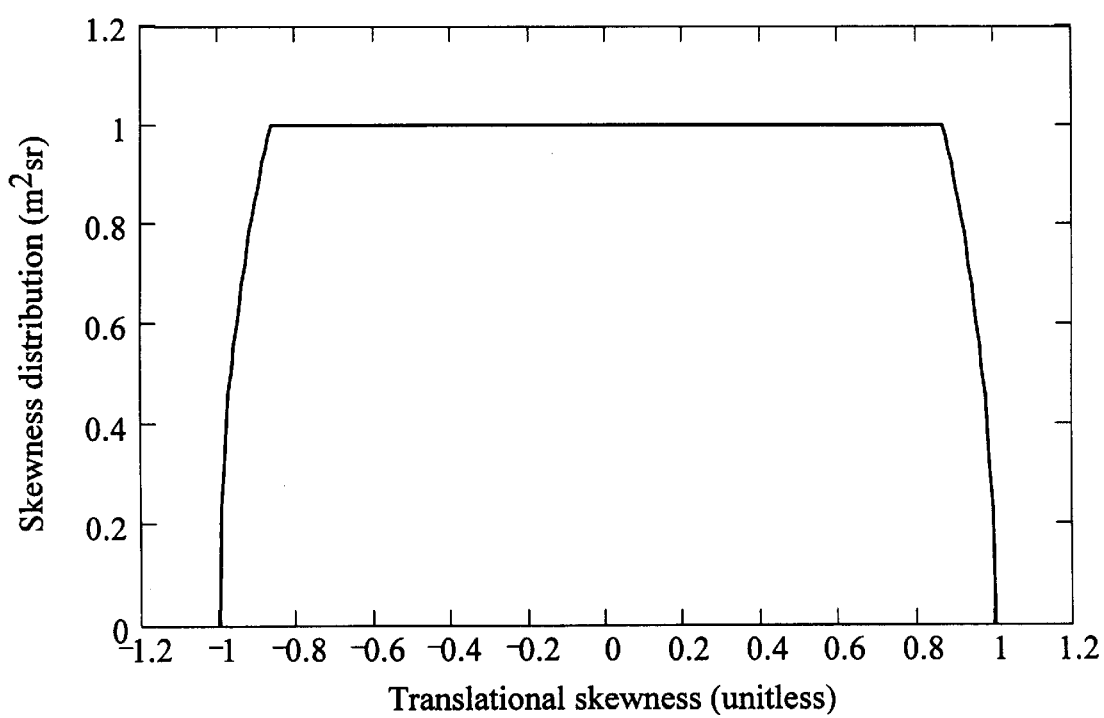
FIG. 4 is a representation of a translational skewness distribution in a unit-refractive-index medium for a 1-m² source having fixed latitudinal angular cutoffs parallel to the symmetry axis and centered on the y,z-plane, where an angular half width of $\Theta_0=30°$ is assumed.

A plot of this skewness distribution is provided in FIG. 4. Integrating Eq. (36) over all $S_z$-values, the total étendue is:

$$\xi_{tot} = n^2 A_{tot}[2\Theta_0 + \sin(2\Theta_0)]. \tag{37}$$

For skewness values of magnitude greater than $S_{z,bnd}$, the skewness distribution of Eq. (36) has the same functional form as the Lambertian case discussed in Section 5.1. However, for skewness values of lower magnitude, the source with the fixed latitudinal angular cutoffs has a constant skewness value, and therefore fails to match the $$\sqrt{n^2 - S_z^2}$$

dependence of a Lambertian source or target. This is consistent with the fact that translationally symmetric concentrators are inherently incapable of transferring all of the source's phase space to the phase-space volume of an equal-étendue Lambertian target, when the source has fixed latitudinal angular cutoffs as described herein.

Skewness Distributions for a Fixed Longitudinal Cutoffs Parallel to Symmetry Axis with Orthogonal Fixed Latitudinal Cutoffs In a fourth example, a slight modification of the second example is provided herein. The longitudinal cutoffs of that section, which are parallel to the symmetry axis and centered on the y,z-plane, are maintained. Additionally, however, a restriction is added that emission is only allowed for optical direction vectors having θ-values satisfying:

$$|\theta| \le \theta_0, \tag{38}$$

where $\theta_0$ is the latitudinal angular half width. The latitude is therefore defined as the angle θ between the optical direction vector and the x,y-plane, as depicted in FIG. 1. Using Eq. (11), the inequality of Eq. (38) becomes:

$$|S_z| \le n \sin(\theta_0). \tag{39}$$

For skewness values satisfying this inequality, the skewness distribution is identical to that of Eq. (29). However, for skewness values outside the interval of Eq. (39), the skewness distribution is identically zero. The distribution for all skewness values is therefore:

$$\frac{d\xi(S_z)}{dS_z} = \begin{cases} 2A_{tot}\sin(\phi_0)\sqrt{n^2 - S_z^2} & \text{when } |S_z| \le n\sin(\theta_0) \\ 0 & \text{otherwise} \end{cases}. \tag{40}$$

Figure 5:
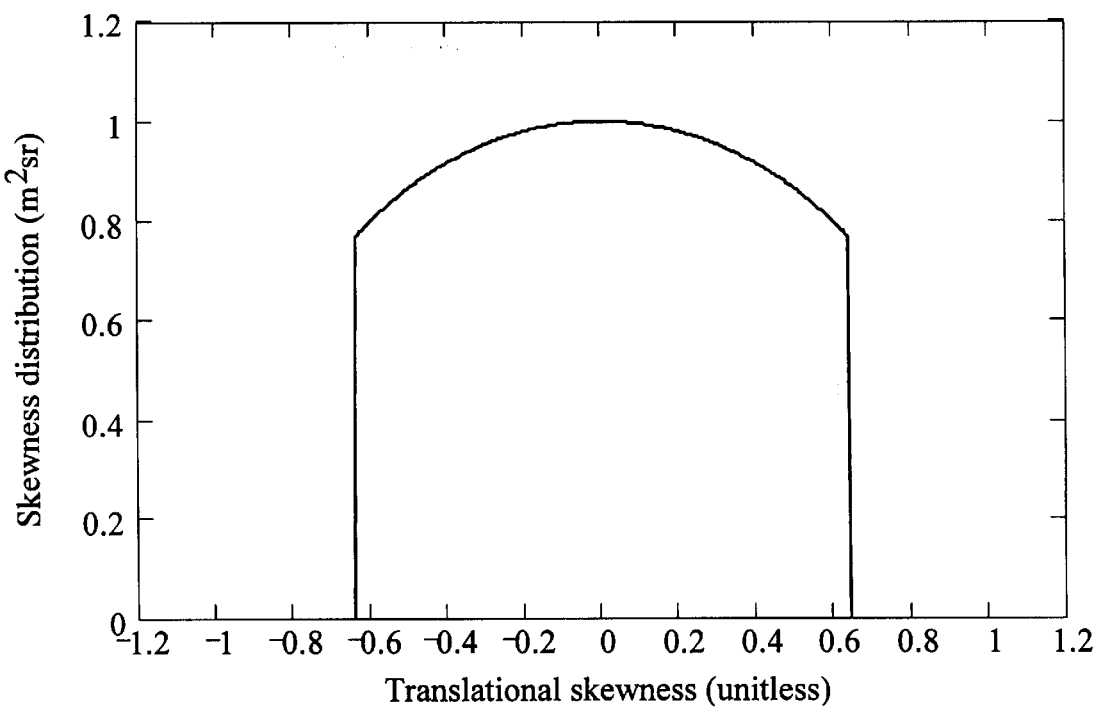
FIG. 5 is a translational skewness distribution in a unit-refractive-index medium for a unit-area source having fixed longitudinal angular cutoffs parallel to the symmetry axis and centered on the y,z-plane, combined with orthogonal fixed latitudinal angular cutoffs centered on the x,y-plane, wherein the longitudinal and latitudinal angular half widths are $\Phi_0=30°$ and $\theta_0=40°$.

This distribution is plotted in FIG. 5. Integrating Eq. (40) over the full range of skewness values, we find that the total étendue for this source is:

$$\xi_{tot} = n^2 A_{tot} \sin(\phi_0)[2\theta_0 + \sin(2\theta_0)]. \tag{41}$$

Once the skewness distributions of a source and target have been computed, Eqs. (9) and (10) can be used to compute the upper limits on efficiency and concentration achievable for that combination of source and target, wherein the optical system is translationally symmetric. The performance limits can be computed for flux transfer to a translationally symmetric Lambertian target from translationally symmetric sources having the angular distributions discussed previously in the last two skewness distribution examples described above.

Flux transfer can be determined for a Lambertian target from a source having fixed latitudinal cutoffs parallel to symmetry axis. In this example a source of the type analyzed in the third Lambertian example above is examined. The latitudinal half-angle, $\Theta_0$, is set as being equal to 23.45°, with refractive index n=1 for both the source and the target. With these choices, the case is representative of an east-west-oriented non-tracking solar concentrator located at the equator and operating every day of the year from sunrise to sunset. The formulas for the target and source étendue are given in Eqs. (27) and (37), respectively. The total surface area of the target is assumed as:

$$A_{trg} = 1 \text{ m}^2. \tag{42}$$

The target étendue can then be calculated as:

$$\xi_{trg} = \pi \text{m}^2 sr. \tag{43}$$

When the source étendue is set equal to the target étendue, Eqs. (37) and (43) give the following value for the total surface area of the source:

$$A_{src} = 2.029 \text{ m}^2. \tag{44}$$

Figure 6:
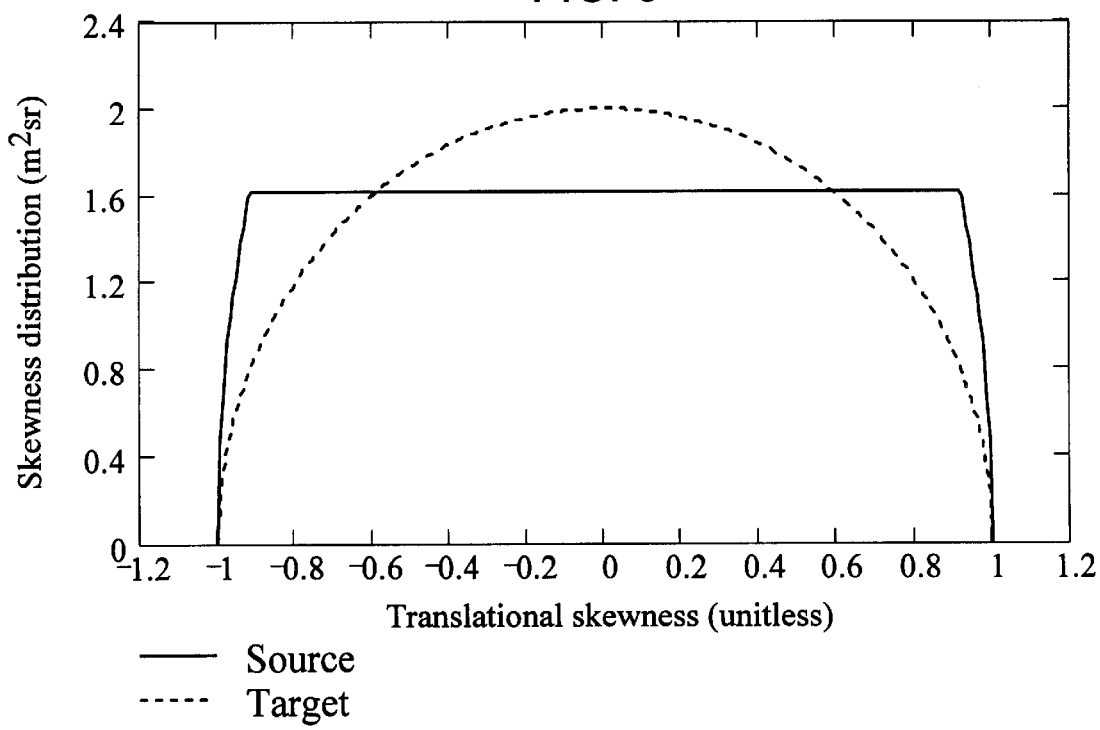
FIG. 6 shows the translational skewness distributions in a unit-refractive-index medium for a Lambertian target and a source having fixed latitudinal cutoffs parallel to the symmetry axis, wherein the angular half width of the source is $\Theta_0=23.45°$ and the source étendue equals that of the target.

For this equal-étendue case, the skewness distributions of Eqs. (26) and (29) are depicted in FIG. 6. The upper limit on étendue that can be transferred from the source to the target by a translationally symmetric concentrator is computed using the integral of Eq. (8). For the equal-étendue case, the upper limit on transferred étendue equals:

$$\xi_{tran,max} = 2.832 \text{ m}^2 sr. \tag{45}$$

With reference to FIG. 6, the étendue limit is equal to that portion of the étendue region contained under the source's skewness distribution that is intersected by the étendue region contained under the target's skewness distribution. As indicated by Eqs. (9) and (10), the upper limits on efficiency and concentration are computed by dividing $\xi_{tran,max}$ by the total source and target étendue, respectively. For the equal-étendue case, the efficiency and concentration have the same value:

$$n_{max} = c_{max} = 90.14\%. \tag{46}$$

Using Eqs. (9) and (10), the efficiency and concentration limits for source-to-target étendue ratios other than unity can be determined. The resulting efficiency limit plotted as a function of the concentration limit is shown in FIG. 7. The diamond-shaped marker in FIG. 7 indicates the efficiency and concentration limits for the equal-étendue case. The efficiency and concentration limits as a function of the source-to-target étendue ratio itself is represented in FIG. 8. It is noteworthy that the equal-étendue case corresponds to the crossing point of the two curves in FIG. 8.

Flux transfer also can be determined for a Lambertian target from a source having fixed longitudinal cutoffs parallel to symmetry axis with orthogonal fixed latitudinal cutoffs in this example, a source of the type analyzed in the Example 4. In this case, the latitudinal half angle is equal to the latitudinal half width of incident solar radiation for non-tracking solar concentrators:

$$\Phi_0 = 23.45°. \tag{47}$$

The refractive index is assumed to be unity for both the source and the target. With these choices, this case is representative of a north-south-oriented non-tracking solar concentrator. For such a concentrator, the appropriate value of the longitudinal half angle $\Phi_0$ depends on the daily hours of operation. For daily operation from sunrise to sunset at an equatorial location, $$\Phi_0=90°. \tag{48}$$

As is apparent from Eq. (40), the choice of $\Phi_0$, affects only the vertical scaling of the skewness distribution. It therefore has no effect on the efficiency and concentration limits as a function of étendue. The formulas for the target and source étendue are described in Eqs. (27) and (41). The total surface area of the target is assumed to equal:

$$A_{trg}=1 \text{ m}^2, \tag{49}$$

so that the target étendue is:

$$\xi_{trg}=\pi \text{m}^2 sr. \tag{50}$$

When the source and target étendue are equal, Eqs. (41) and (50) give the following value for the total surface area of the source:

$$A_{src}=2.029 \text{ m}^2. \tag{51}$$

Figure 9:
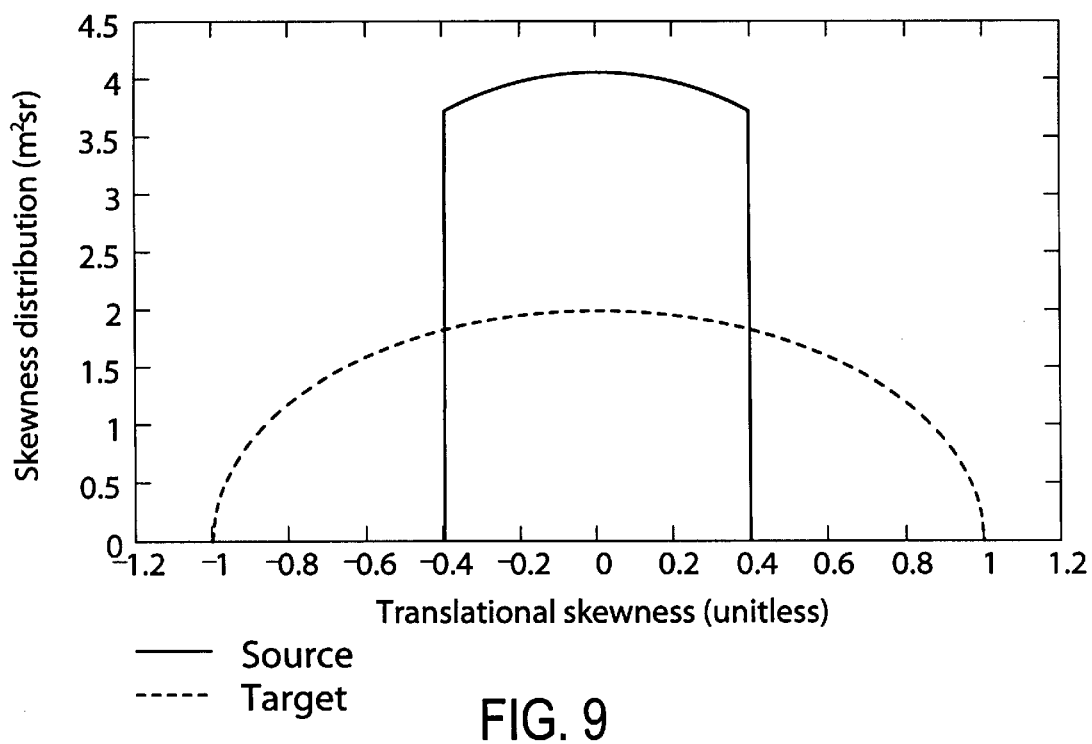
FIG. 9 is a plot of a translational skewness distribution in a unit-refractive-index medium for a Lambertian target and a source having fixed longitudinal cutoffs parallel to symmetry axis with orthogonal fixed latitudinal cutoffs, wherein the latitudinal angular half width of the source is $\theta_0=23.45°$ and the source étendue equals that of the target.

For this equal-étendue case, the skewness distributions of Eqs. (26) and (40) are depicted in FIG. 9. The upper limit on étendue that can be transferred from the source to the target by a translationally symmetric concentrator is computed using the integral of Eq. (8). For the equal-étendue case, this upper limit on transferred étendue equals:

$$\xi_{tran,max}=1.549 \text{ m}^2 sr. \tag{52}$$

The upper limits on efficiency and concentration are computed by dividing $\xi_{tran,max}$ by the total source and target étendue, respectively. For the equal-étendue case, the efficiency and concentration limits have the same value:

$$\eta_{max}=C_{max}=49.30\%. \tag{53}$$

Figure 10:
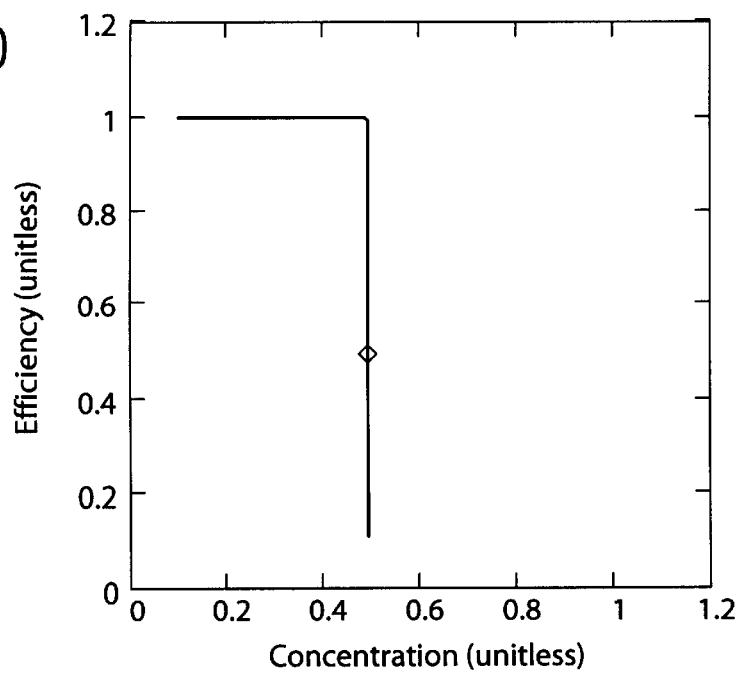
FIG. 10 is a plot of the efficiency limit as a function of the concentration limit for translationally symmetric nonimaging devices that transfer flux to a Lambertian target from a source having fixed longitudinal cutoffs parallel to symmetry axis with orthogonal fixed latitudinal cutoffs, wherein the latitudinal angular half width of the source is $\theta_0=2345°$ and the diamond-shaped marker indicates the performance limit for the equal-étendue case.
Figure 11:
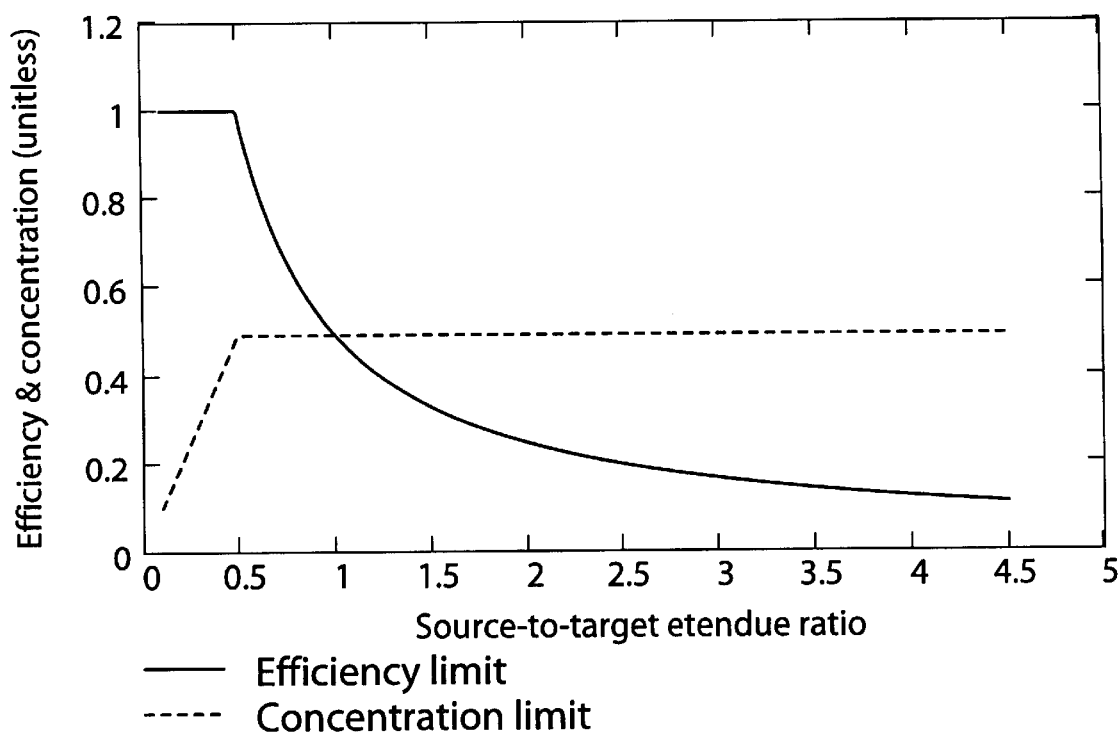
FIG. 11 is a plot of the efficiency and concentration limits as a function of the source-to-target étendue ratio for translationally symmetric nonimaging devices that transfer flux to a Lambertian target from a source having fixed longitudinal cutoffs parallel to symmetry axis with orthogonal fixed latitudinal cutoffs, wherein the latitudinal angular half width of the source is $\theta_0=23.45°$ and the equal-étendue case corresponds to the crossing point of the two curves.

It is also possible to compute efficiency and concentration limits for source-to-target étendue ratios other than unity. The resulting efficiency limit as a function of the concentration limit is shown in FIG. 10. As before, the diamond-shaped marker on this plot indicates the efficiency and concentration limits for the equal-étendue case. Plots of the efficiency and concentration limits as a function of the source-to-target étendue ratio are provided in FIG. 11. It should be noted that the concentration limit never exceeds the 49.30% value of Eq. (53). This is due to the half width of the skewness distribution of the source is always $\sin(\theta_0)$= 0.3979, independent of the value of the source-to-target étendue ratio. Thus no matter what value of the source-to-target étendue ratio is used, no étendue can be transferred from the source to the target by a translationally symmetric nonimaging device for skewness values satisfying $0.3979<|S_2|\leq 1$.

Figure 12:
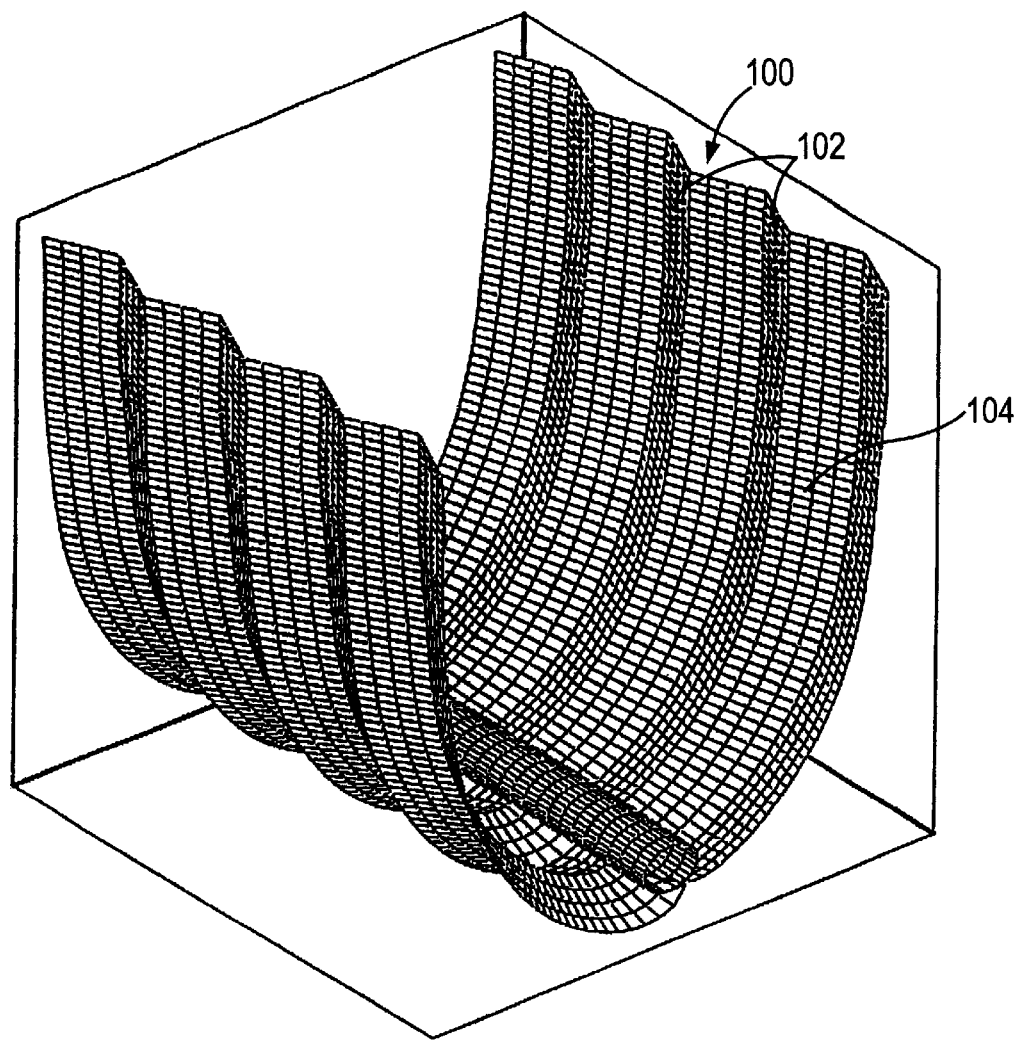
FIG. 12 is a three-dimensional representation of a non-tracking solar concentrator including a plurality of symmetry-breaking ridges in accordance with one embodiment of the invention.

As discussed previously, substantially north-south non-tracking solar concentrators are conventionally understood to have lower overall efficiencies and performance characteristics than non-tracking solar concentrators that are arranged in a substantially east-west direction. FIG. 12 shows a sample north-south non-tracking solar concentrator 100 incorporating a plurality of symmetry-breaking ridges 102 arranged on the inner face 104 of the solar concentrator 100. The performance of a concentrator 100 is increased with the optimal positioning of the ridges 102. In this case, the ridges 102 have generally a V-shape and have a width of about one millimeter.

To overcome the performance limits associated with symmetry, a device having broken symmetry is required. Designs for optimized reflective projection optics have been developed that overcome the limits of rotational symmetry by means of symmetry-breaking microstructure ridges. We now present a computer-optimized design that uses analogous microstructure ridges to overcome the performance limits imposed by translational symmetry. We consider the case of a north-south-oriented non-tracking solar concentrator in a material of $$\phi_0=50°. \tag{54}$$

unit refractive index, as discussed previously. The latitudinal half angle of the solar radiation is 23.45°, as in Eq. (47). The target is assumed to be a 20-mm-diameter cylindrical tube. As an example, equal-étendue case is considered, with longitudinal half angle $$\rho_{arc,trg}=2.648. \tag{55}$$

Since the sun's angular position changes by 15° every hour, this half angle corresponds to a total daily operation interval of 6 hr, 40 min. As shown in Eq. (53), the translational skew invariant places an upper limit on efficiency and concentration of 49.30%. It can be shown by inspection that the involute CPC operates at this upper limit for this case, and therefore represents an optimal translationally symmetric solution. The equal-étendue assumption—along with Eqs. (41), (47), (50), and (54)—gives a source-to-target area ratio of:

With this source-to-target area ratio, the involute CPC has a collection half angle of:

$$\chi_{CPC}=\arcsin\left(\frac{1}{\rho_{arc,frg}}\right)=22.19°. \tag{56}$$

To improve performance beyond the 49.30% a limit, a type of perturbed involute CPC is used. To break the symmetry, microstructure ridges are added to the surface, with the ridges having peaks and valleys perpendicular to the translational symmetry axis. The effect of constant-tilt-angle microstructure ridges, superimposed on a conventional CPC has previously been considered. In the present case, however, the ridge-tilt angle is a function of position along the reflector's shape profile. The ridge slopes alternate in sign as a function of position along the symmetry axis. The ridges are assumed to be sufficiently small that they can be considered to alter only the surface-normal vector as a function of position over the surface of the concentrator, without altering the macroscopic shape. In addition to the symmetry-breaking microstructure, the macroscopic shape profile itself is perturbed relative to the involute CPC. The microstructure tilt angle as a function of position along the shape profile is modeled as a cubic spline. The absolute value of the tilt angle is constrained to be less than or equal to 30°. Imposition of this angular limit improves the overall manufacturability. In addition, this angular limit simplifies the ray tracing and reduces reflection losses by preventing more than two reflections from occurring for each ray incident on the region between two ridges.

The Dynamic Synthesis global optimization algorithm is used to maximize the flux-transfer efficiency of the nontranslationally-symmetric solar collector. The computed efficiency and concentration of the optimized collector in this example were found to be:

$$\eta_{optum}=C_{optum}=72.7\%, \tag{57}$$

Figure 37:
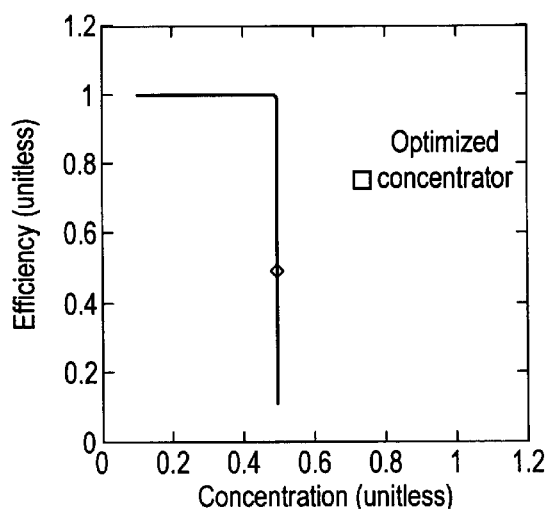
FIG. 37 is a plot of the efficiency limit as a function of the concentration limit for translationally symmetric nonimaging devices that transfer flux to a Lambertian target from a source having fixed longitudinal cutoffs parallel to symmetry axis with orthogonal fixed longitudinal cutoffs, wherein the latitudinal half width of the source is $\theta_0=23.45°$, and wherein the performance achieved by the optimized non-translationally symmetric concentrator and baseline concentrator for the case of $\phi_0=50°$ is indicated by the square and diamond lines, respectively.
Figure 38:
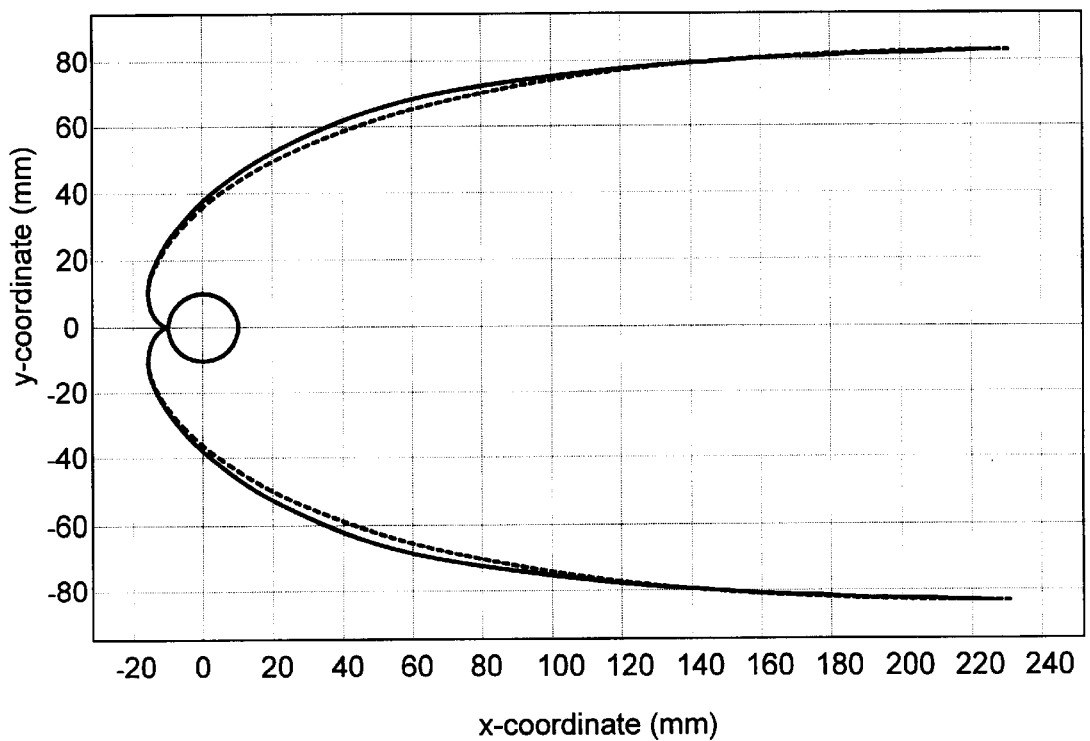
FIG. 38 is a shape profile of an optimized solar collector, wherein the dashed line indicates the shape profile of the baseline translationally symmetric concentrator comprising an involute CPC.
Figure 39:
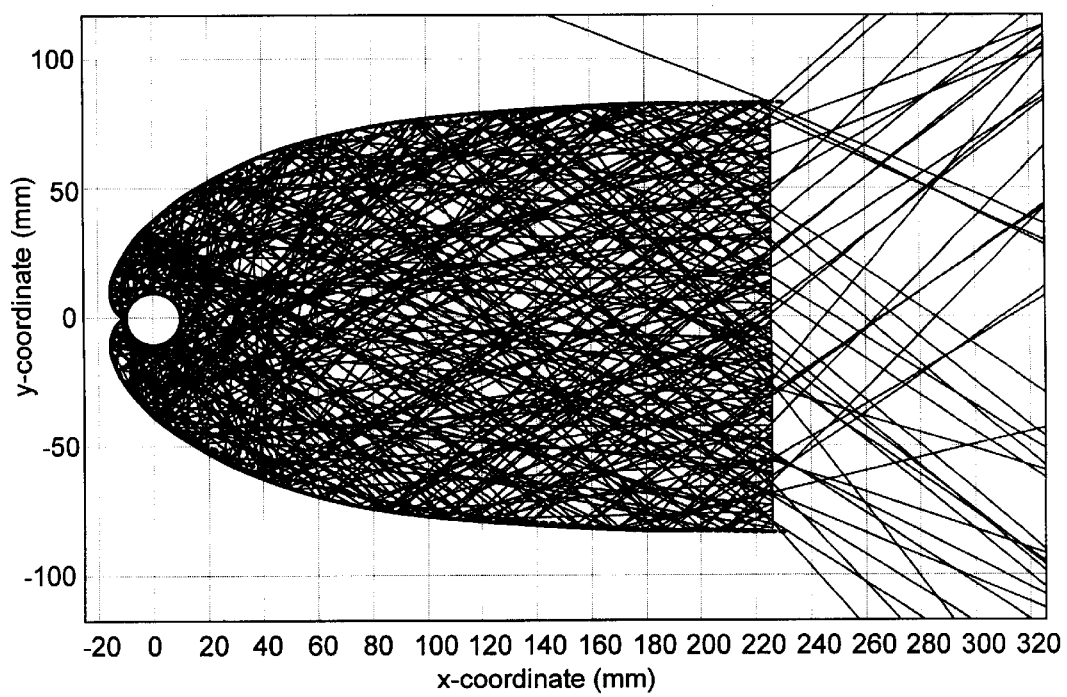
FIG. 39 is the shape profile of the optimized solar collector of FIG. 38 with the addition of traced rays.
Figure 40:
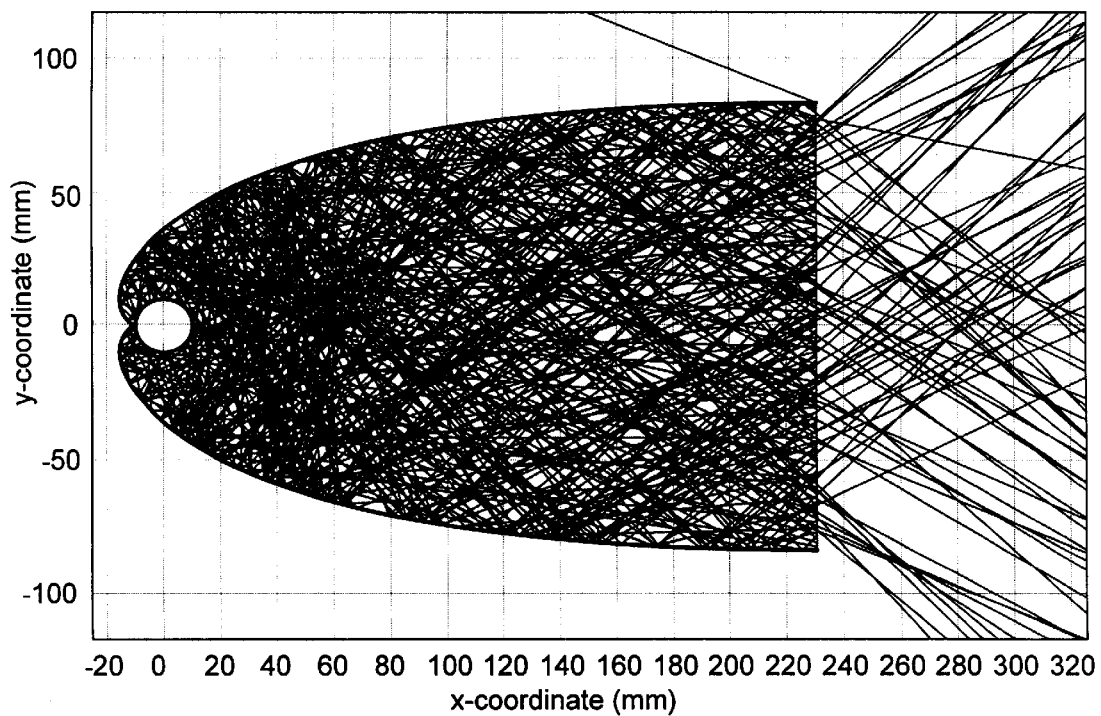
FIG. 40 is a shape profile of the baseline translationally symmetric concentrator shown in FIG. 38 with traced rays.
Figure 41:
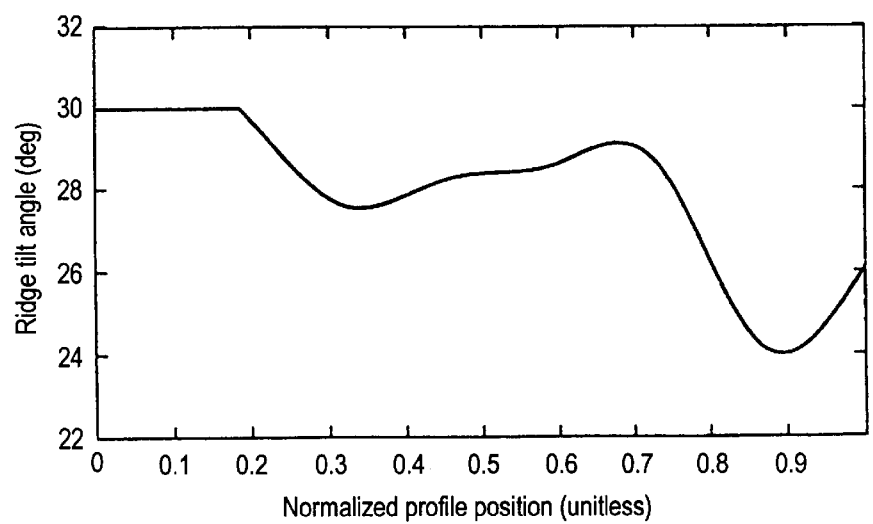
FIG. 41 is a plot of the tilt angle of the microstructure ridges as a function of the normalized position along the optimized concentrator's shape profile.

This represents a 47.4% performance improvement relative to the baseline translationally symmetric concentrator. The performance of this optimized design is indicated by the square marker on the efficiency versus concentration plot shown in FIG. 37. The shape profile of the optimized collector, without and with traced rays, is shown in FIGS. 38 and 39, respectively. For comparison, the profile of the baseline unperturbed involute CPC is depicted in FIGS. 38 and 39 as a dashed line. A ray trace through the baseline concentrator is shown in FIG. 40. The rays visible to the right of the aperture in FIGS. 39 and 40 represent rays that have been rejected by the concentrator. As expected from the higher efficiency of the optimized concentrator, fewer rejected rays are visible in FIG. 39 than in FIG. 40. A three-dimensional depiction of the optimized concentrator is shown in FIG. 12. To illustrate the microstructure geometry, the relative size of the symmetry-breaking ridges has been magnified by a large factor in this figure. The tilt angle of the ridges as a function of the normalized position along the optimized concentrator's shape profile is plotted in FIG. 41.

Figure 42:
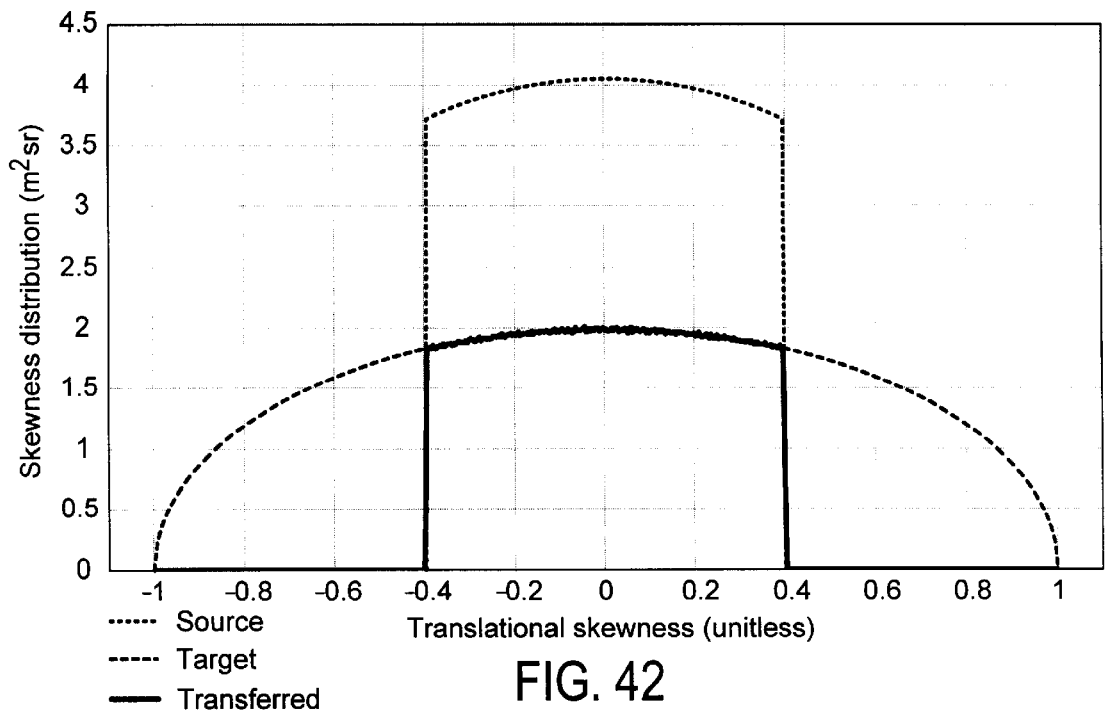
FIG. 42 is a plot of the source, target, and transferred skewness distributions for the baseline translationally symmetric concentrator.
Figure 43:
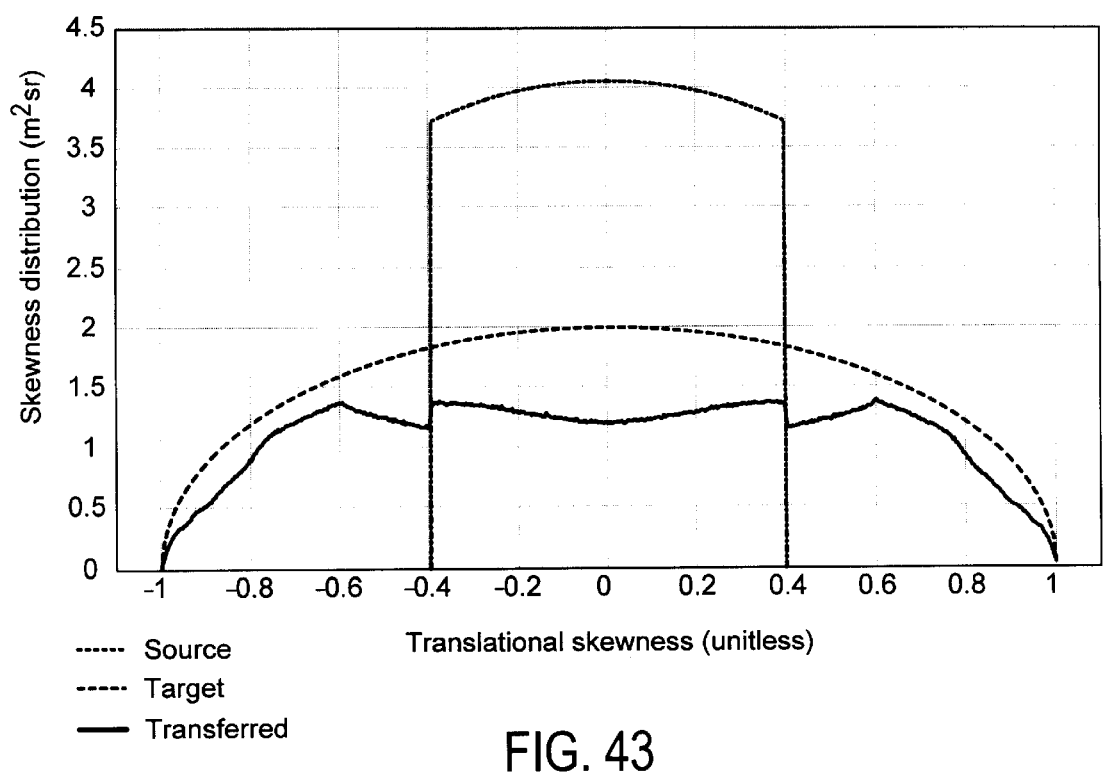
FIG. 43 is a plot of the source, target, and transferred skewness distributions for the optimized nontranslationally symmetric concentrator.

Plots of the transferred skewness distributions for the baseline and optimized concentrators are provided in FIGS. 42 and 43. As expected, the skewness distribution for the translationally symmetric baseline design precisely matches the region of overlap of the skewness distributions of the source and target. The non-translationally symmetric optimized design, however, has produced a broadening of the skewness distribution of the flux transferred to the target, thereby providing a better match to the target's distribution.

The ridge microstructure used to break the symmetry of the optimized concentrator can be thought of as a form of diffuser. As such, it has the effect of introducing a large number of small holes in the phase-space volume transferred to the target. Since these holes are not filled with radiation from the source, their presence reduces the achievable flux-transfer efficiency. The introduction of holes into the phase-space volume is analogous to the production of froth by injecting air bubbles into a liquid. In the same way that the presence of froth reduces the amount of liquid that can be poured into a container of a given volume, the presence of phase-space froth reduces the amount of étendue that can be transferred from a source to a target. For this reason, 100% flux-transfer efficiency from a source to a target of equal étendue can probably never be achieved by means of microstructure ridges of the type considered herein. A related observation is that, since it is a diffuser, the microstructure can only produce a spreading of the skewness distribution. When the target's skewness distribution is narrower than that of the source, this spreading of the skewness distribution will only exacerbate the skewness mismatch between the source and the target, thereby reducing the achievable efficiency and concentration.

A second non-translationally-symmetric north-south-oriented non-tracking solar collector was designed for the equal étendue case with a longitudinal half-angle of:

$$\phi_0 = 90°. \quad (58)$$

This half angle is representative of dawn-to-dusk operation of the concentrator. The computed flux-transfer efficiency and concentration for this second optimized design were found to be:

$$\eta_{optum} = C_{optum} = 68.4\%. \quad (59)$$

which represents a 38.7% performance improvement relative to the optimal translationally symmetric design.

A variety of types of symmetry-breaking reflector structures can be used on the solar concentrator 100. In addition to symmetry-breaking ridges 102, it is also possible that indentations, particle suspensions, embossments or stamp-ings could be used on the inner face 104 of the solar concentrator 100. Furthermore, it may also be possible that lamination, paint, or some other material could be applied to the inner face 104 to provide a selected degree of nonuniformity to the solar concentrator 100.

Figure 13:
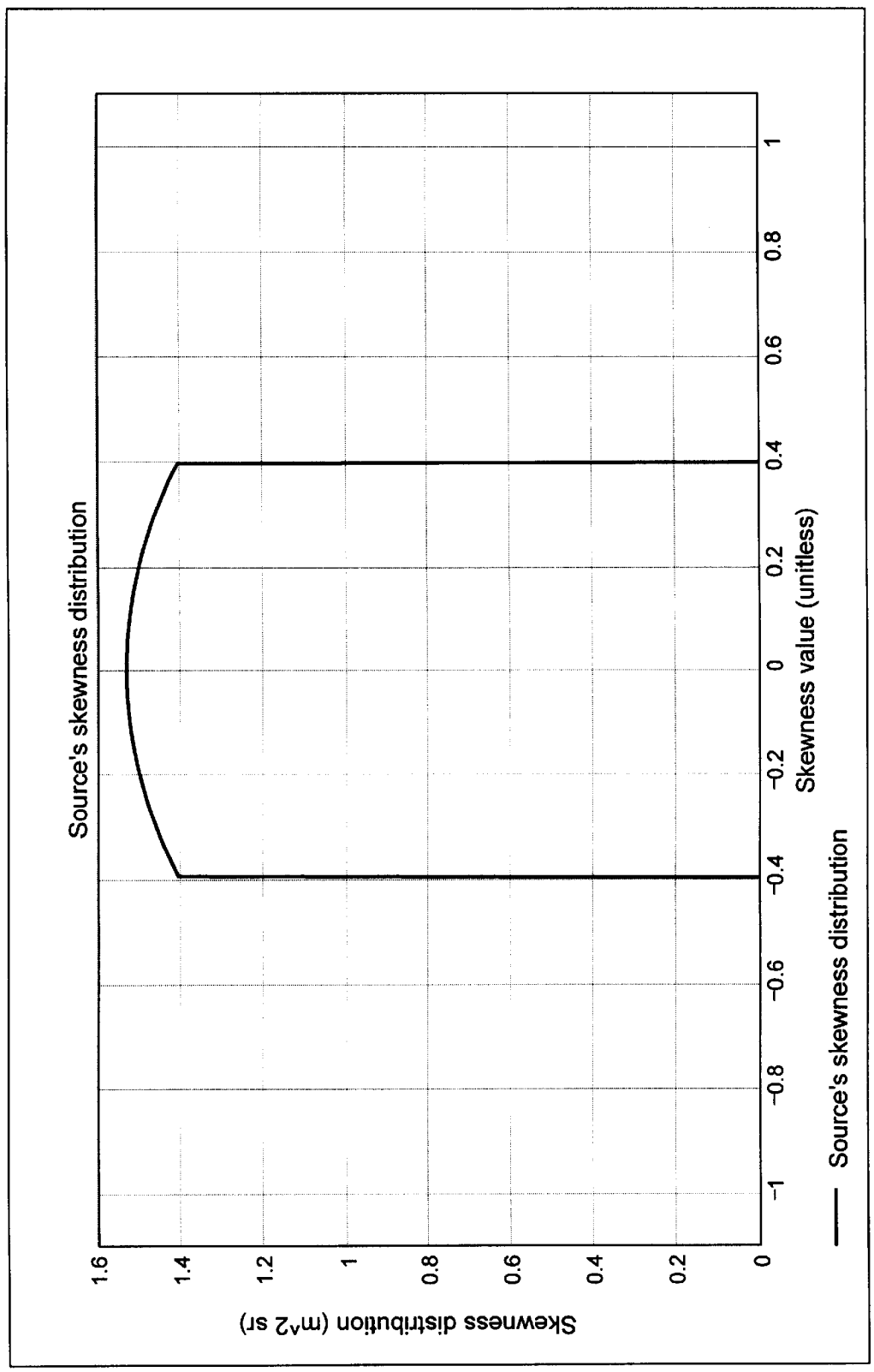
FIG. 13 is a representation of the skewness distribution for a source.
Figure 14:
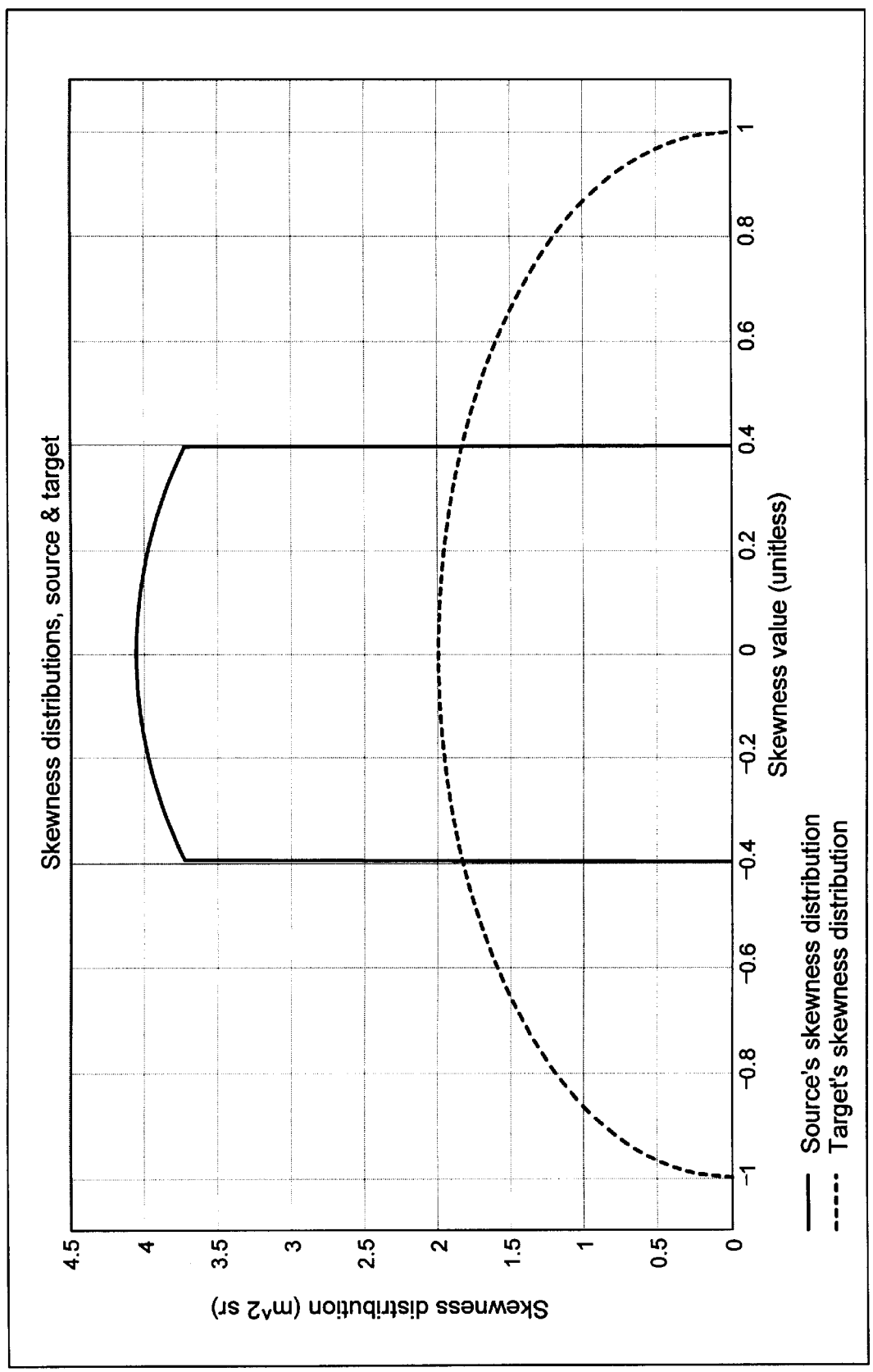
FIG. 14 is a representation of the skewness distributions for the source and target when equal étendue are assumed.
Figure 15:
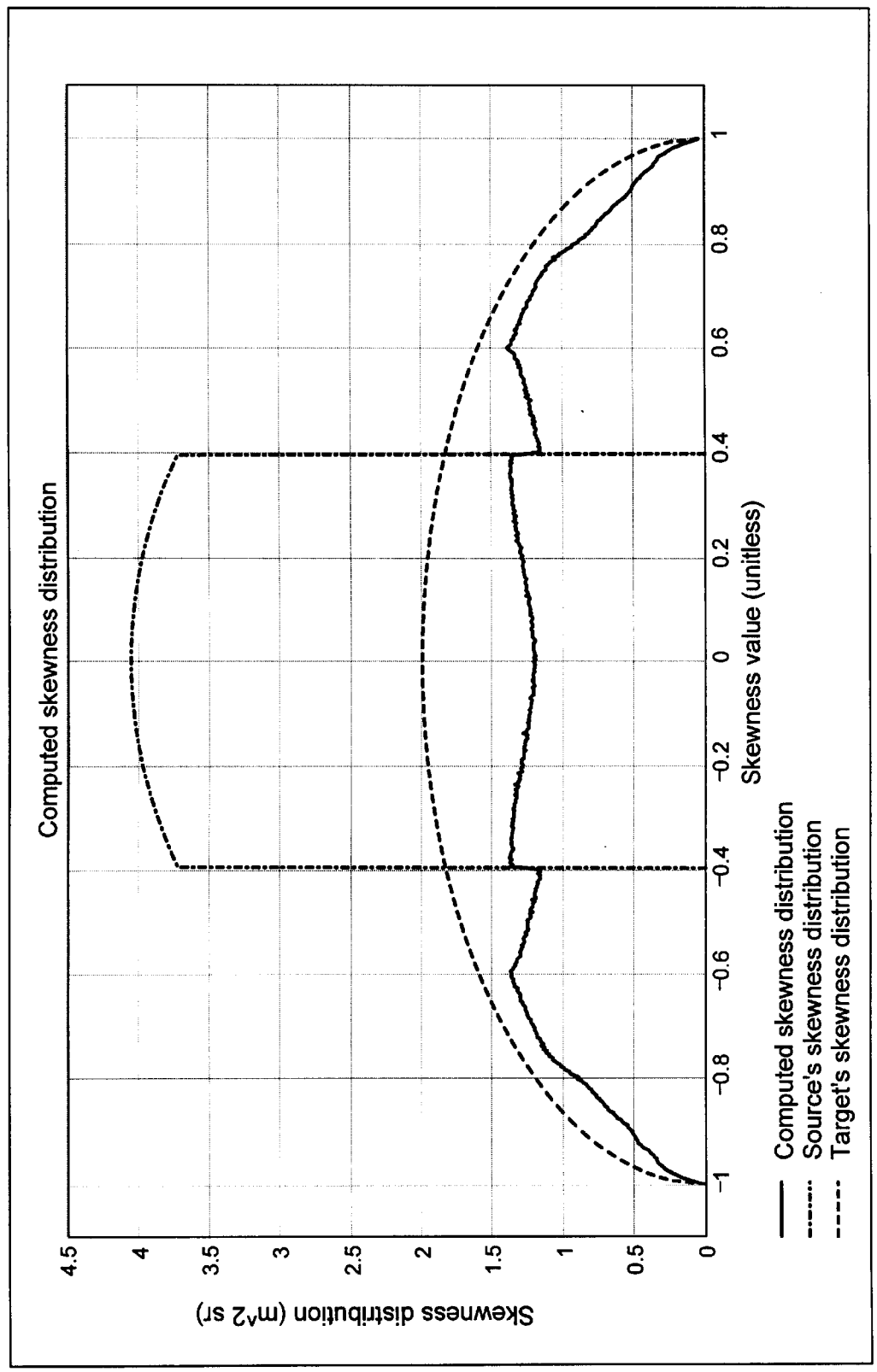
FIG. 15 is a representation of the computed skewness distributions for flux that is transferred to the target area.

A computer program can perform an iterative procedure in order to determine an improved or optimal arrangement of symmetry-breaking structures. One such commercially available program is the Nonimaging Concentrator Synthesis (NICOS) Code and was developed by SAIC. The NICOS code provides the capability to perform radiometric analysis and/or optimal synthesis of nonimaging optical concentrator and projector designs operating with extended radiating sources and multi-element reflective and/or refractive optics. A printout of one such procedure is included in Appendix A. During the mathematical procedure, the skewness distribution for the source is calculated, and this distribution is represented in FIG. 13. The skewness distribution for the target area is also calculated and compared to the distribution for the source with equal étendue being assumed. This comparison is represented in FIG. 14, and a computed skewness distribution is also calculated, as shown in FIG. 15.

Figure 16:
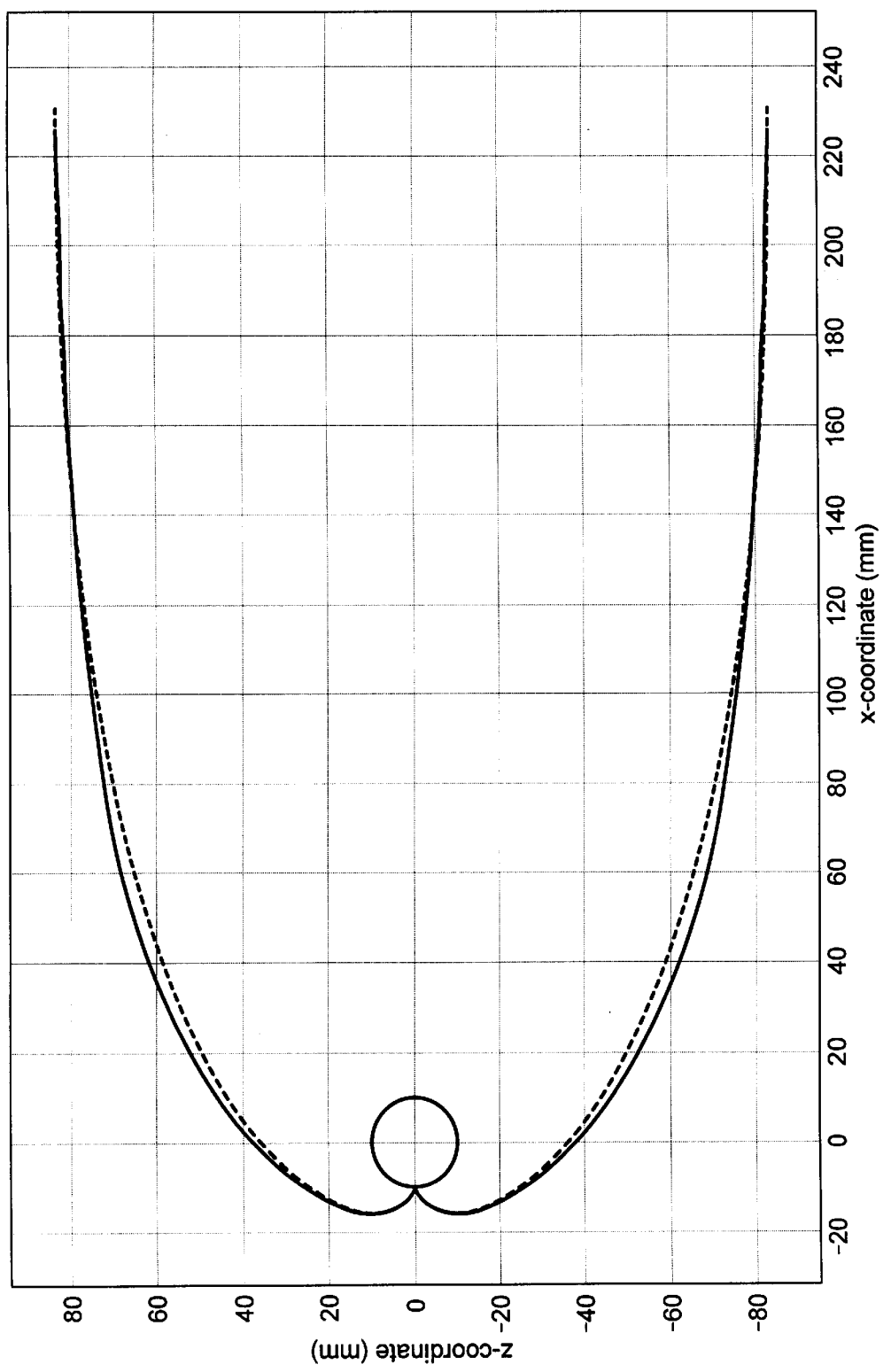
FIG. 16 is a plot showing the optimized design of the solar concentrator described in Appendix B in the x,z plane.
Figure 17:
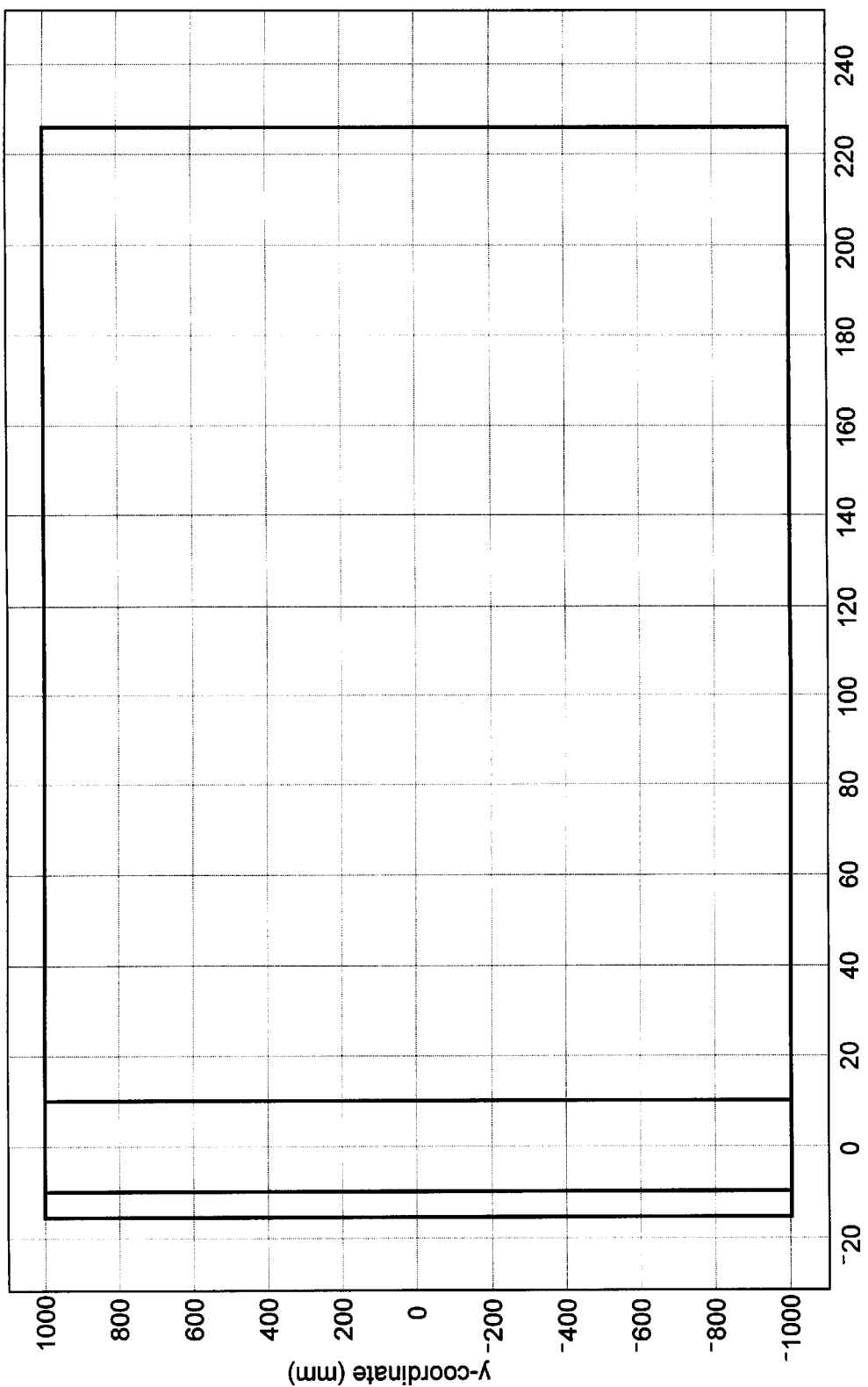
FIG. 17 is a plot showing the optimized design of the solar concentrator described in Appendix B in the x,y plane.
Figure 18:
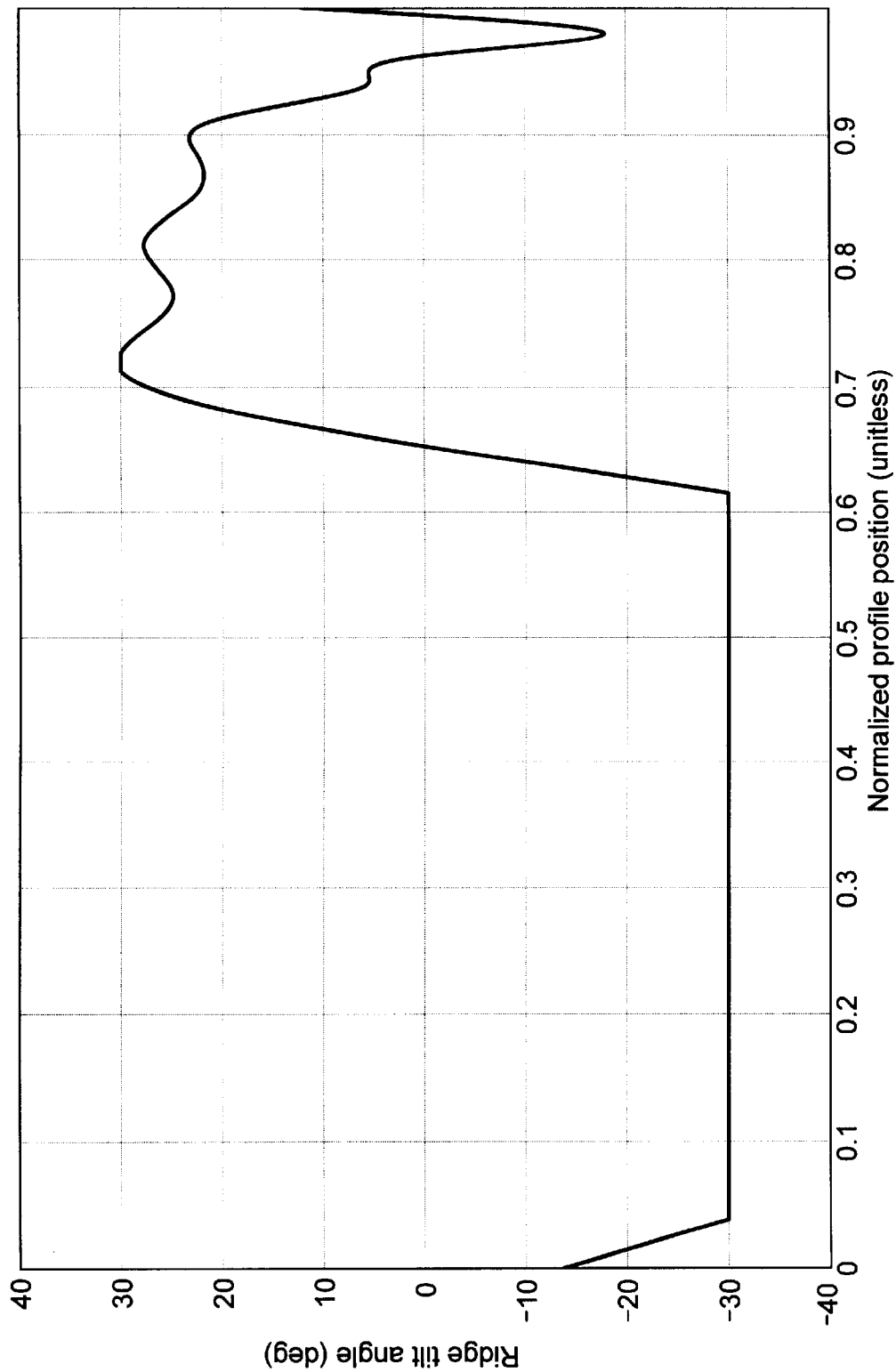
FIG. 18 is a plot showing the ridge tilt angle relative to the normalized profile position for the optimized concentrator design disclosed in Appendix B.
Figure 19:
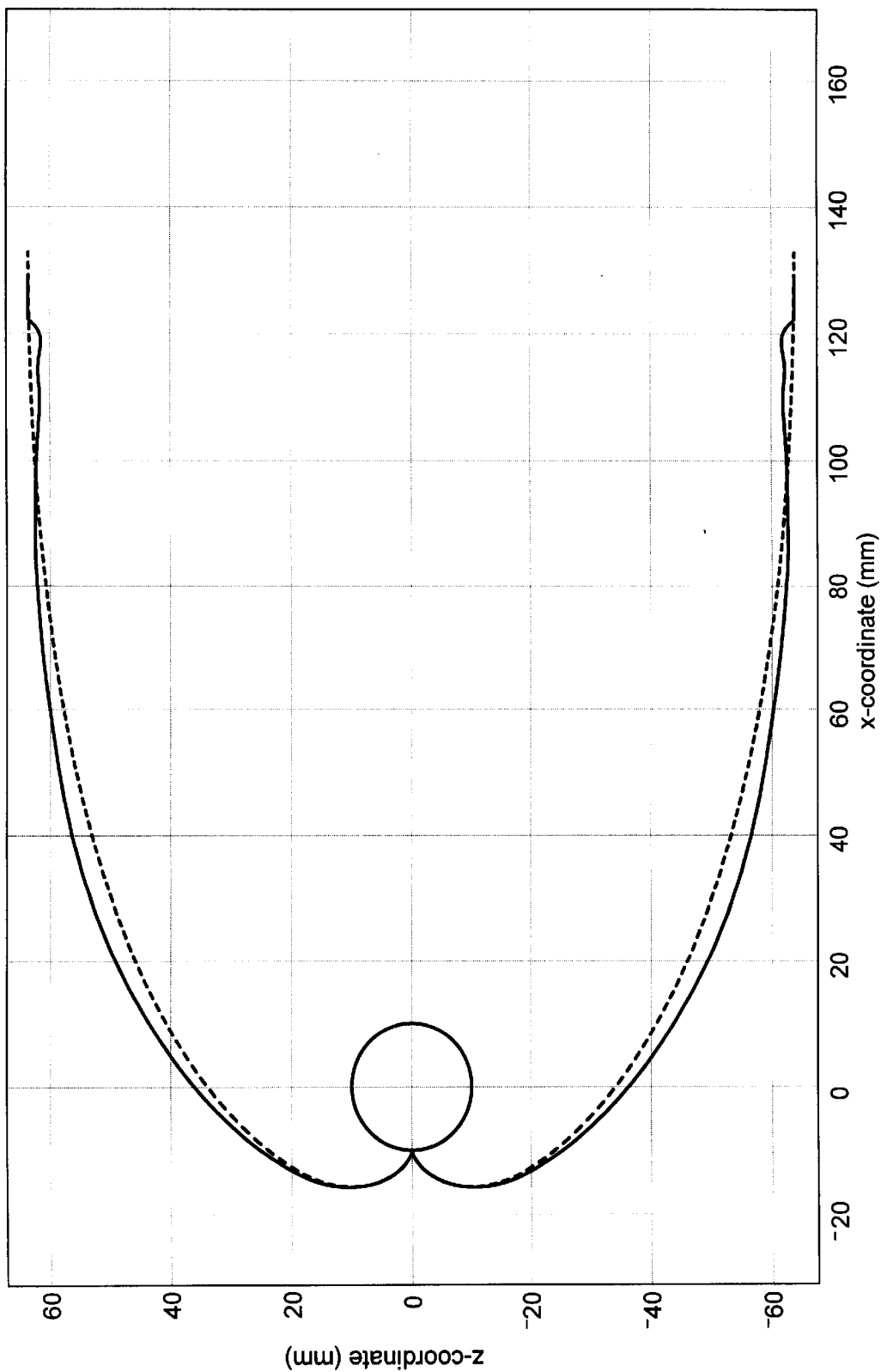
FIG. 19 is a plot showing the optimized design of the solar concentrator described in Appendix C in the x,z plane.
Figure 20:
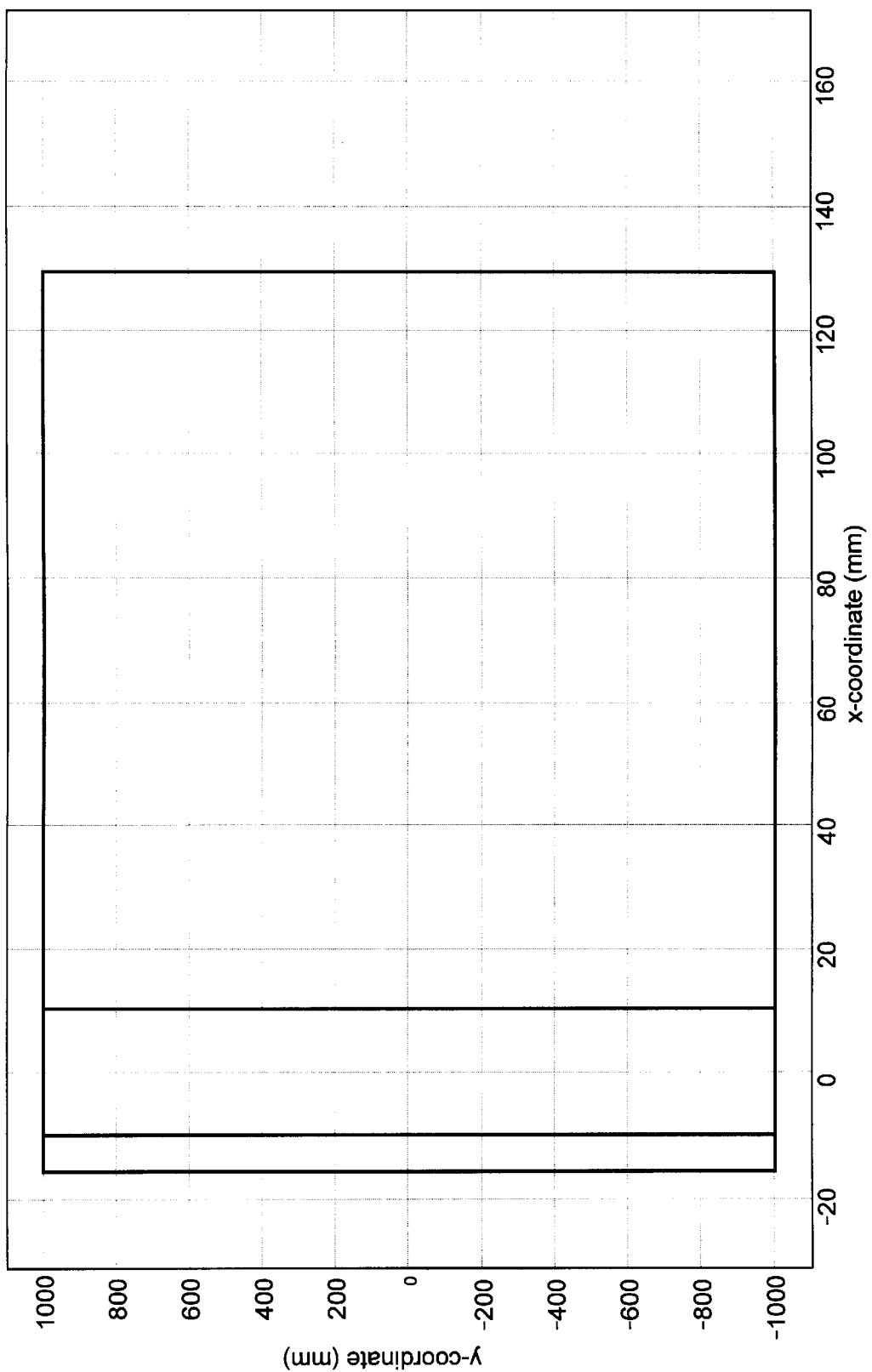
FIG. 20 is a plot showing the optimized design of the solar concentrator described in Appendix C in the x,y plane.
Figure 21:
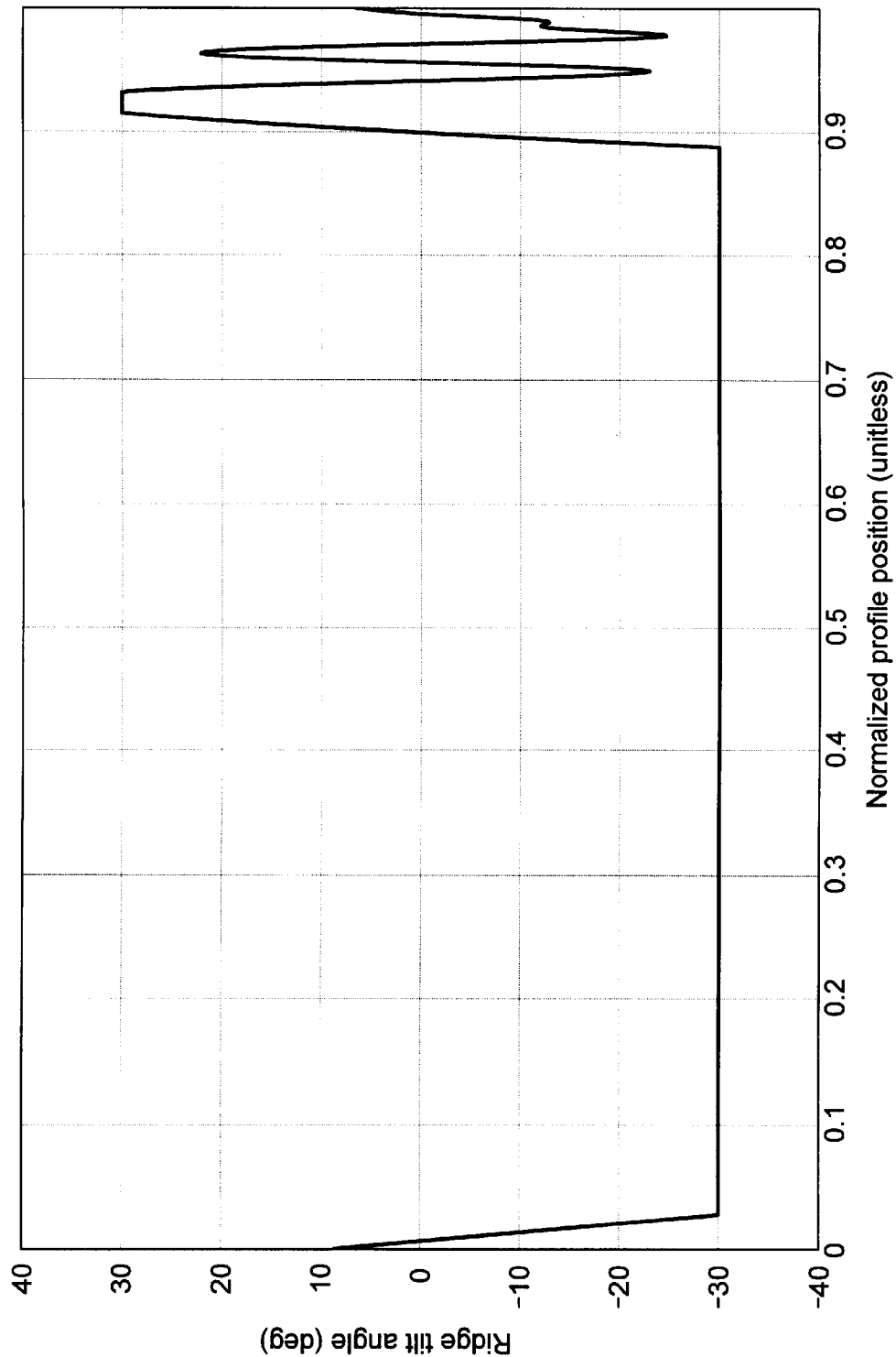
FIG. 21 is a plot showing the ridge tilt angle relative to the normalized profile position for the optimized concentrator design disclosed in Appendix C.

The computer program and data in Appendix B and Appendix C discloses examples of optimized concentrator designs using designated input characteristics. Both of these examples begin with identical concentrators except for the aperture width, wherein the width of the concentrator disclosed in Appendix B is wider than the concentrator disclosed in Appendix C. For the concentrator disclosed in Appendix B, the optimized design of the concentrator given the input characteristics is shown in FIGS. 16 and 17, with FIG. 16 representing the design in the x,z plane and FIG. 17 showing the design in the x,y plane. For the concentrator of Appendix C, the design in the x,z plane is shown in FIG. 19, while the design in the x,y plane is disclosed in FIG. 20. For the optimized design, the ridge tilt angle can also be determined relative to the normalized profile position. This is represented in FIG. 18 for the concentrator detailed in Appendix B and in FIG. 21 for the concentrator detailed in Appendix C. For the case, outlined in Appendix B, a flux-transfer efficiency of about 70.9% was calculated for the design. A flux-transfer efficiency of about 67.8% was determined for the design analyzed in Appendix C.

Figure 22:
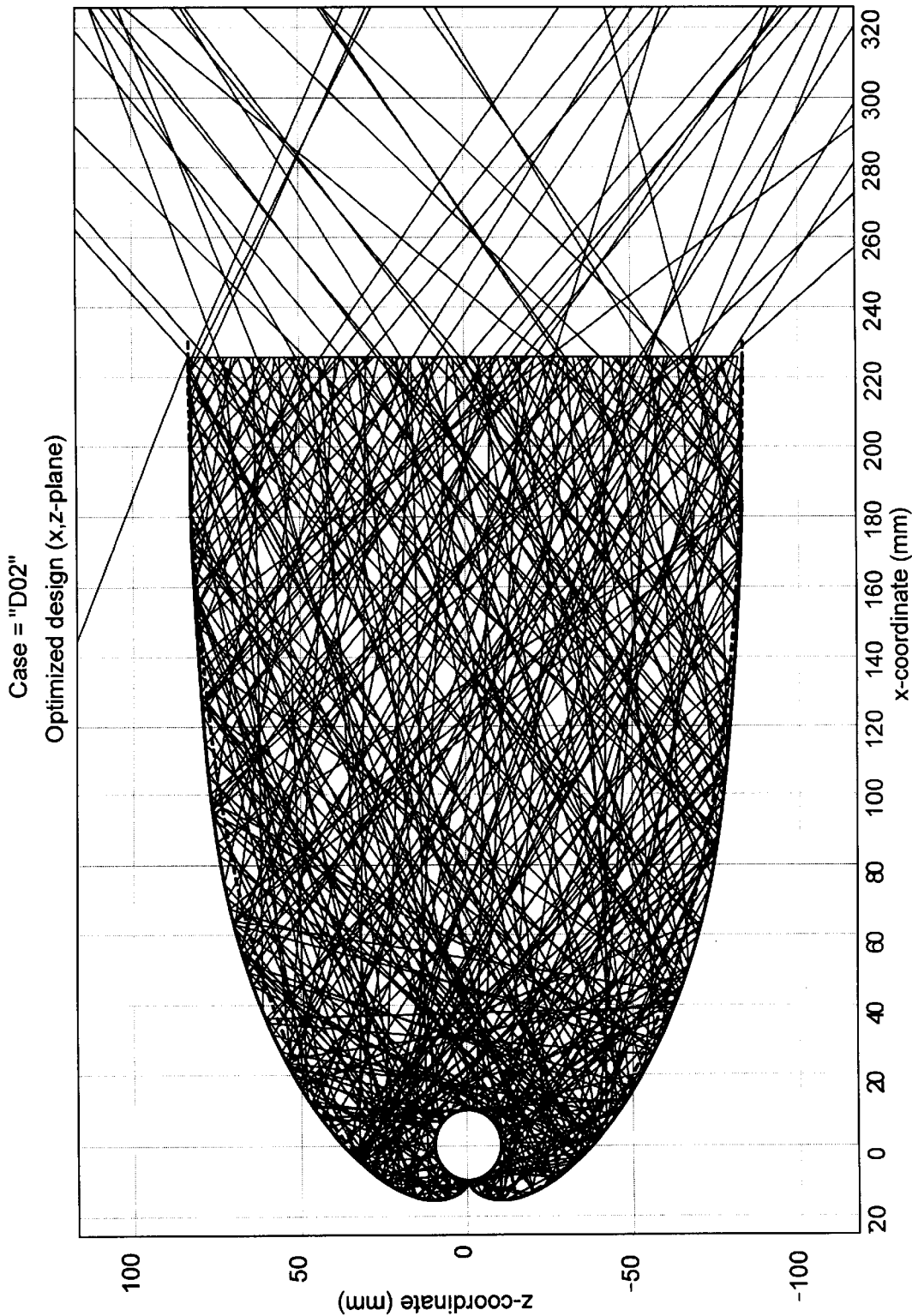
FIG. 22 is a plot showing the optimized design of the solar concentrator described in Appendix D in the x,z plane.
Figure 23:
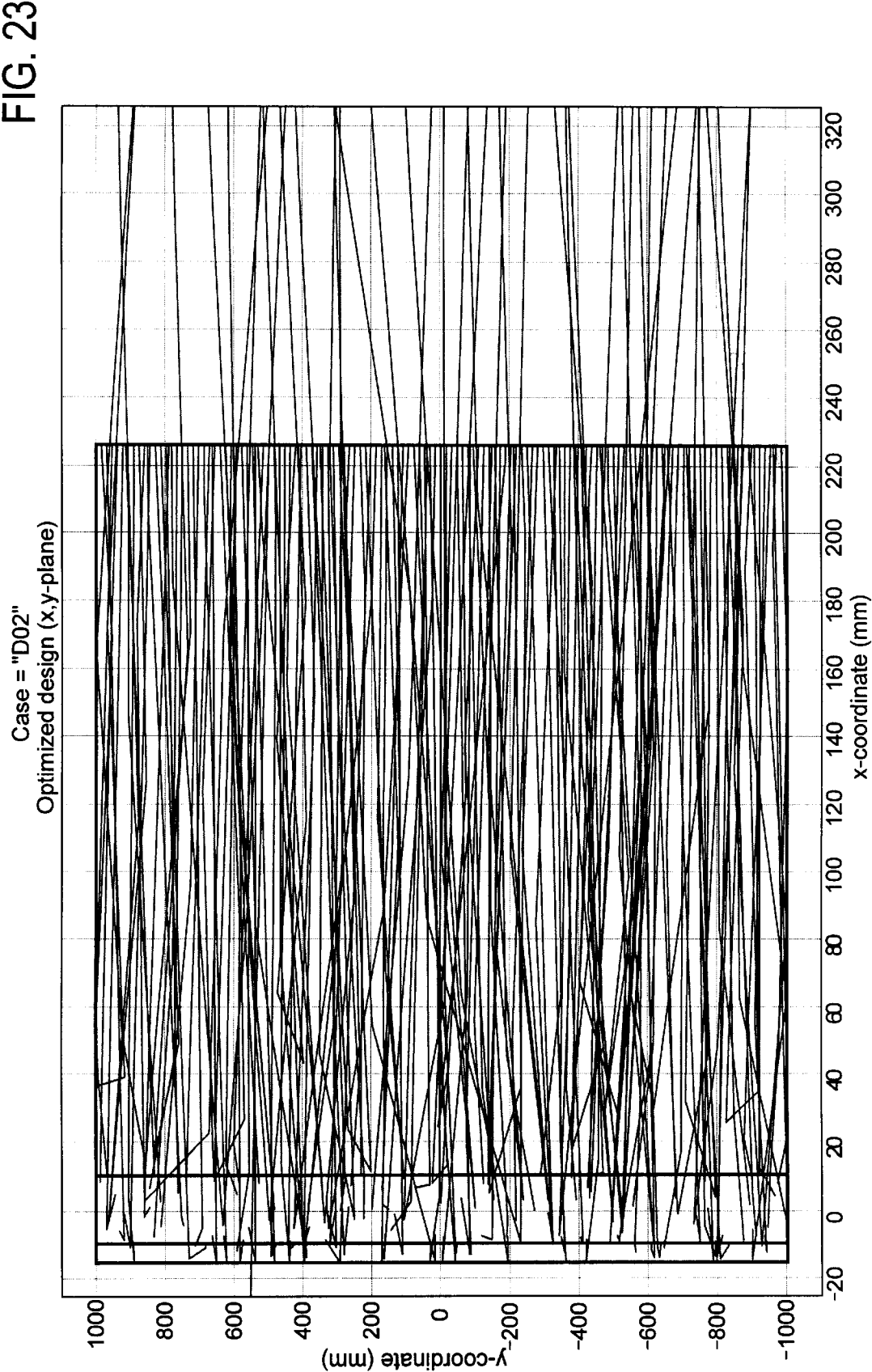
FIG. 23 is a plot showing the optimized design of the solar concentrator described in Appendix D in the x,y plane.
Figure 24:
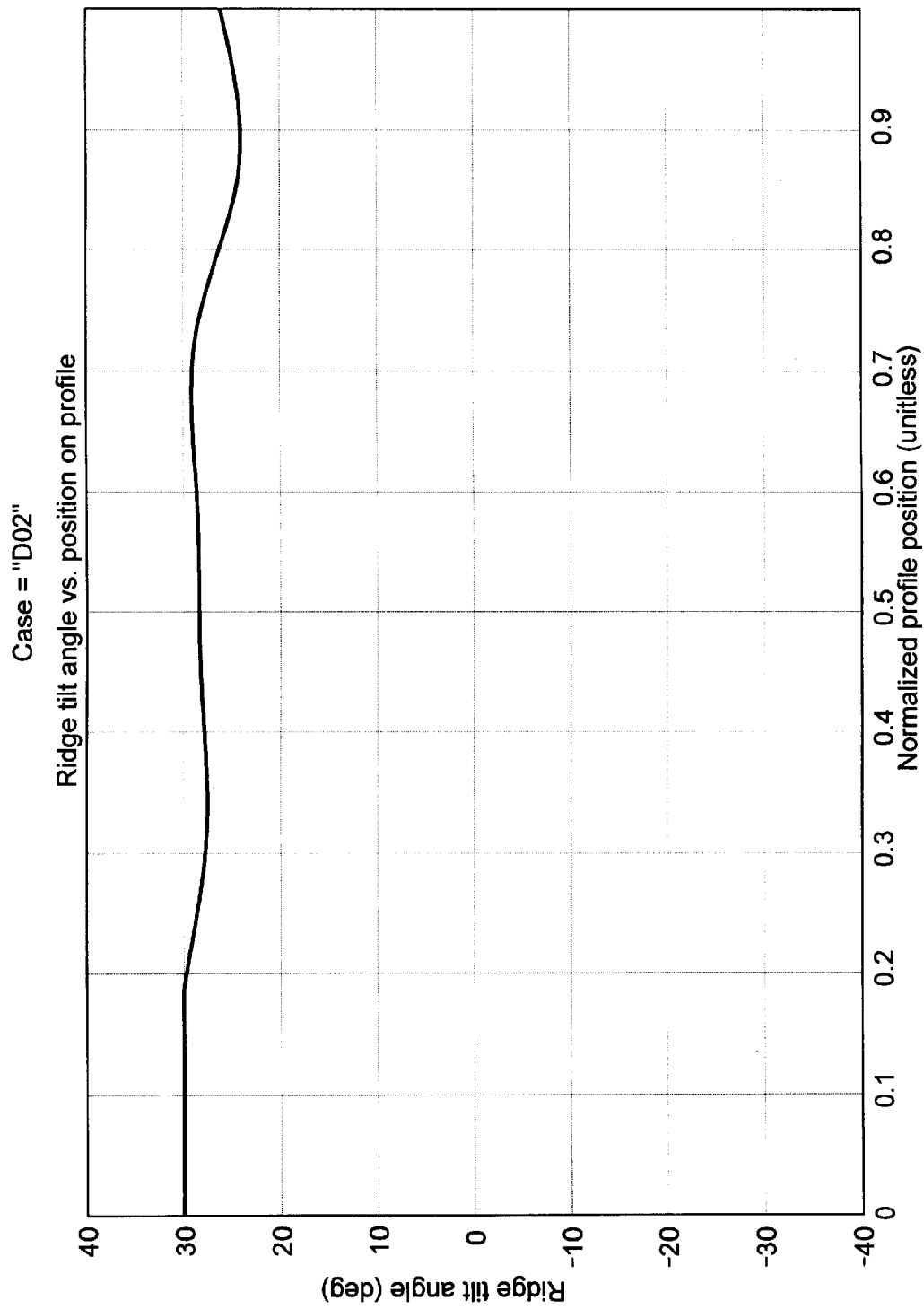
FIG. 24 is a plot showing the ridge tilt angle relative to the normalized profile position for the optimized concentrator design disclosed in Appendix D.
Figure 25:
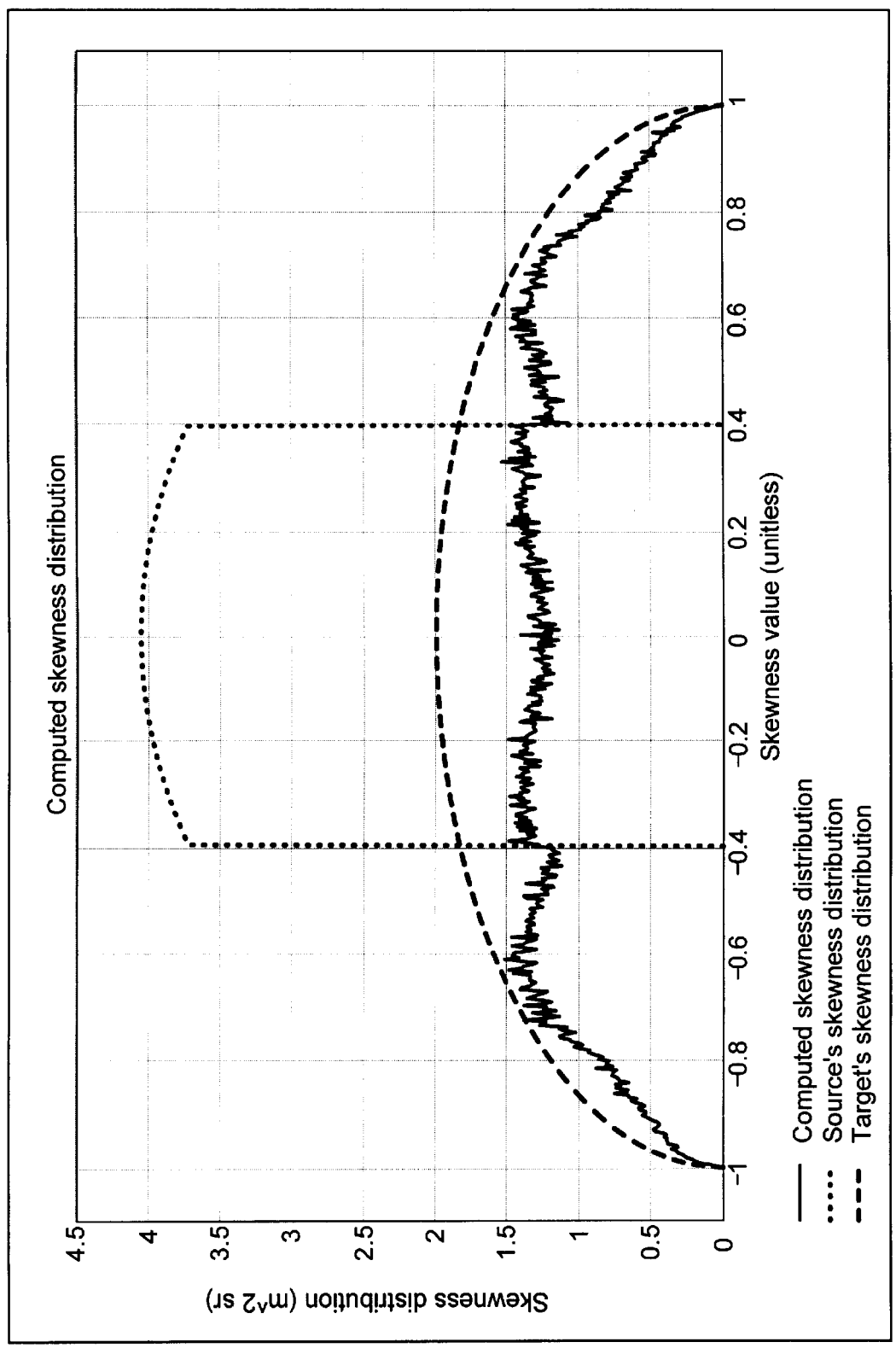
FIG. 25 is a representation of the computed skewness distributions for flux that is transferred to the target area for the optimized concentrator design disclosed in Appendix D.
Figure 26:
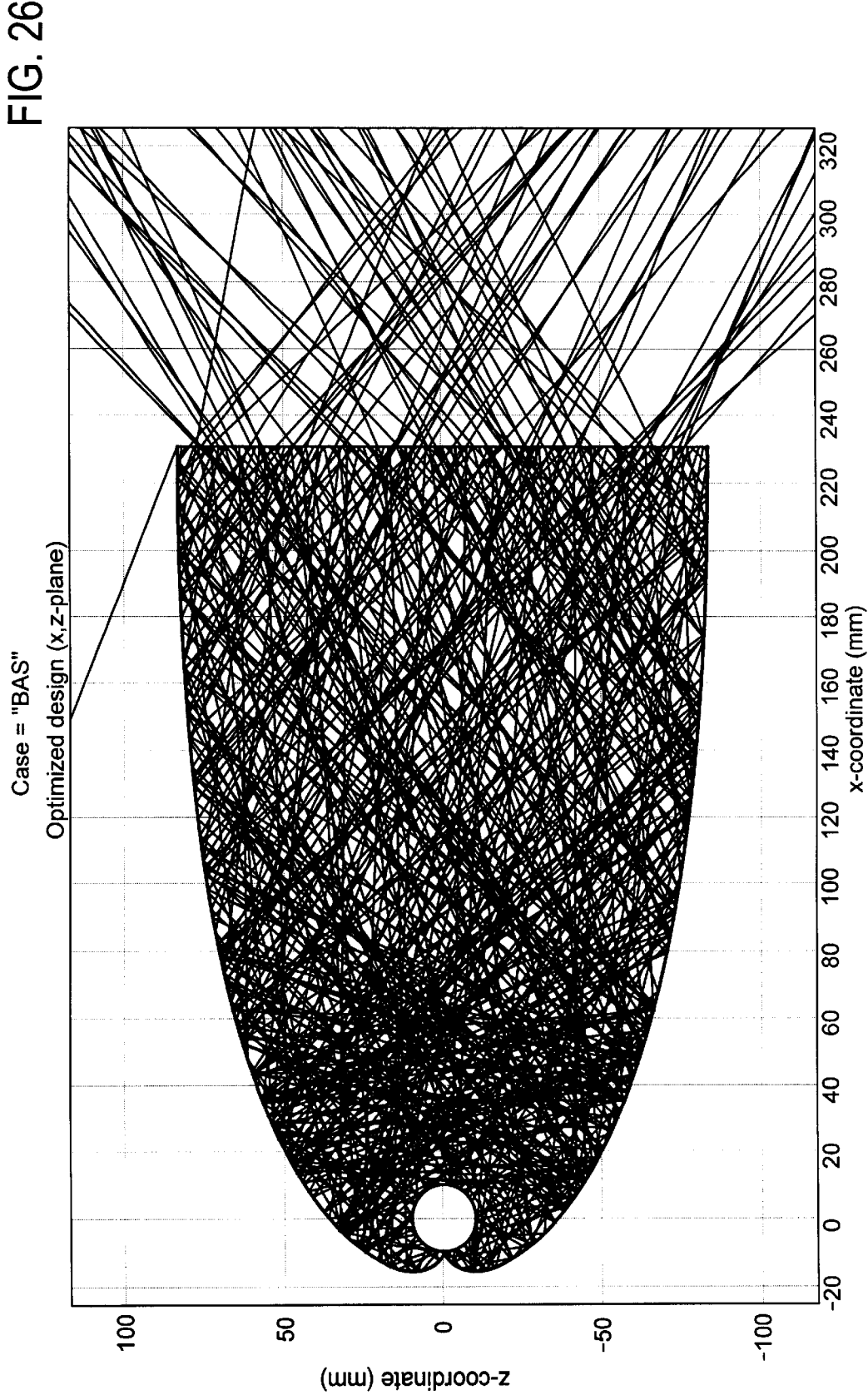
FIG. 26 is a plot showing the unperturbed involute design of the solar concentrator described in Appendix E in the x,z plane.
Figure 27:
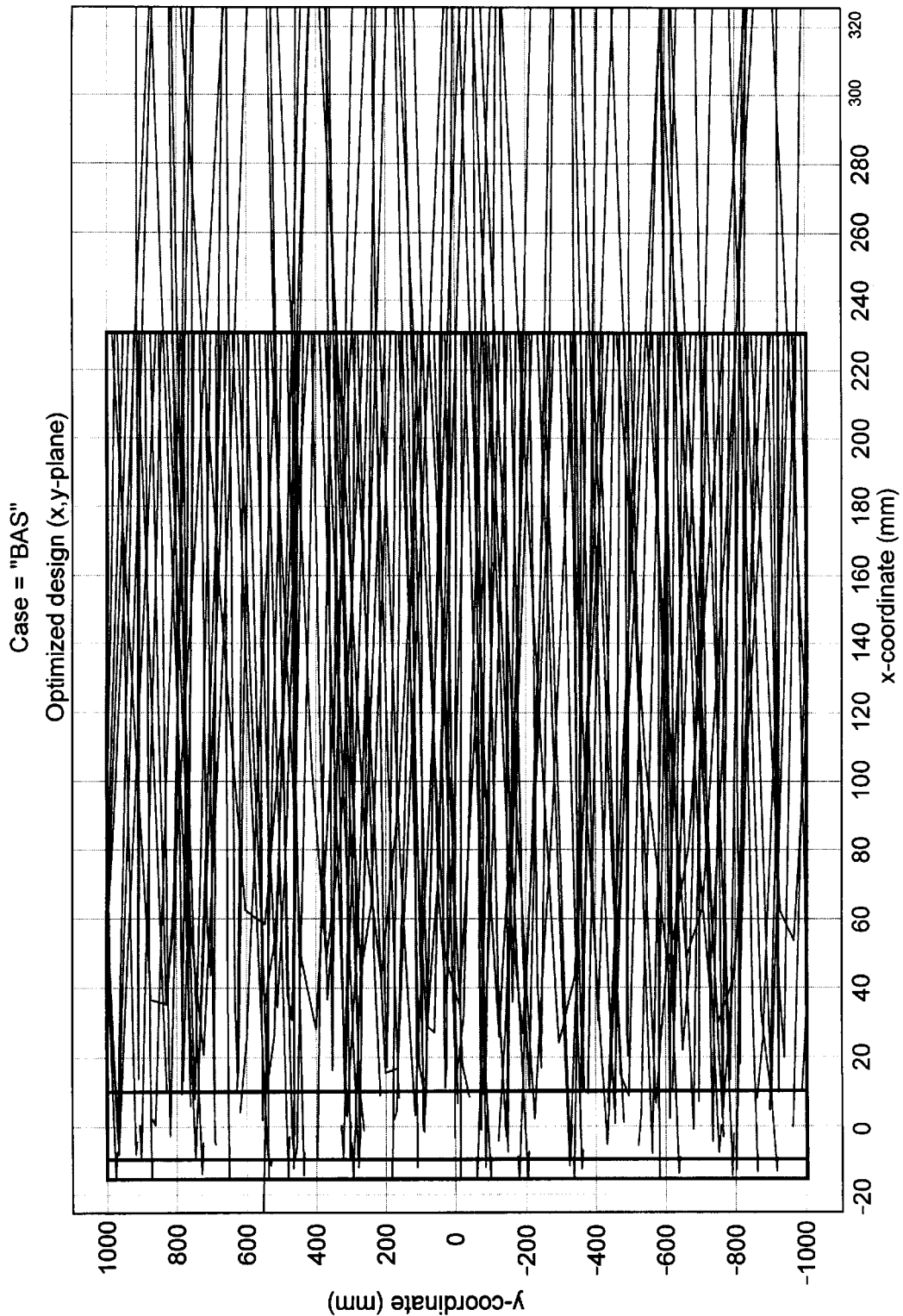
FIG. 27 is a plot showing the unperturbed involute design of the solar concentrator described in Appendix E in the x,y plane.
Figure 28:
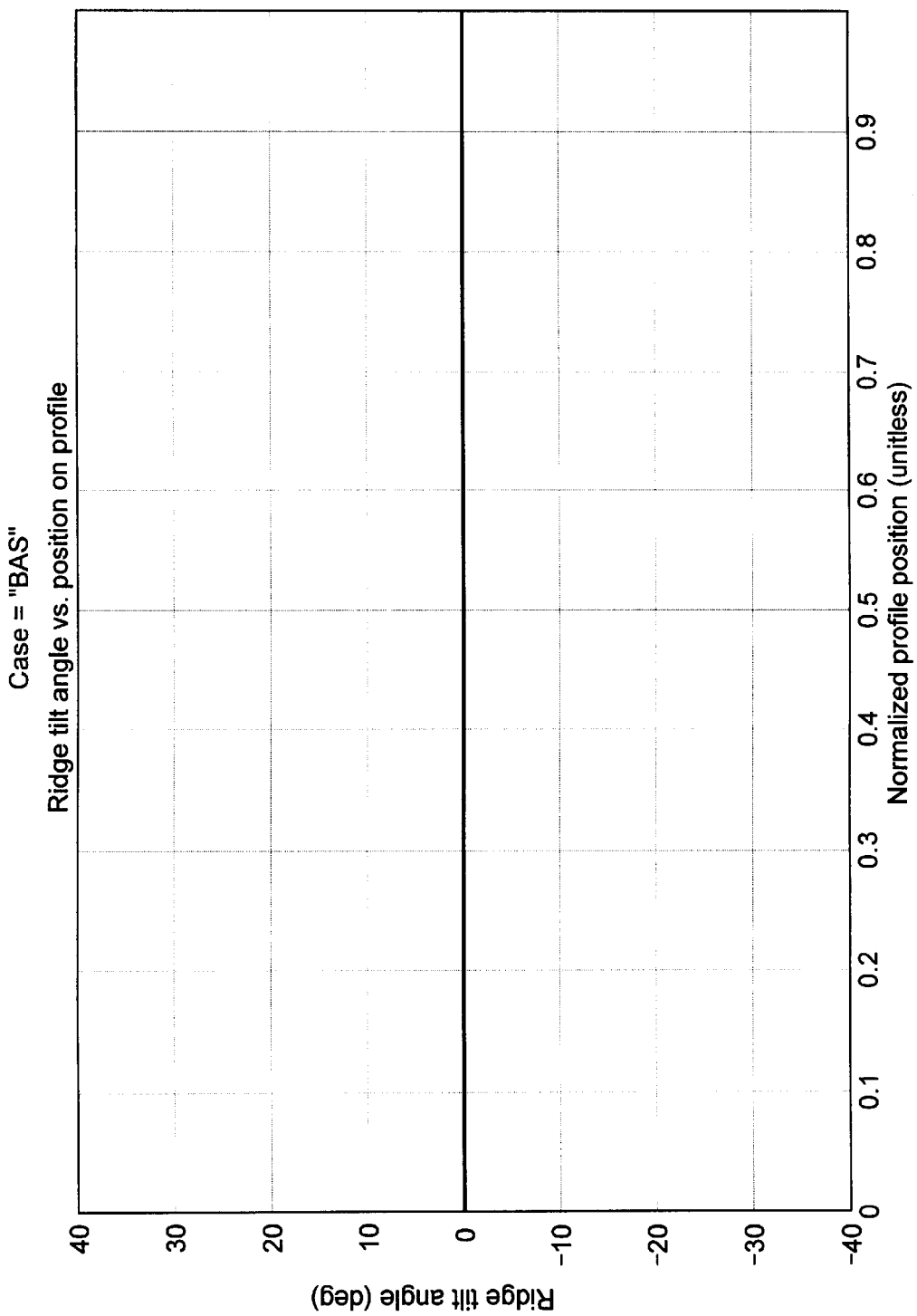
FIG. 28 is a plot showing the ridge tilt angle relative to the normalized profile position for the unperturbed involute concentrator design disclosed in Appendix E.
Figure 29:
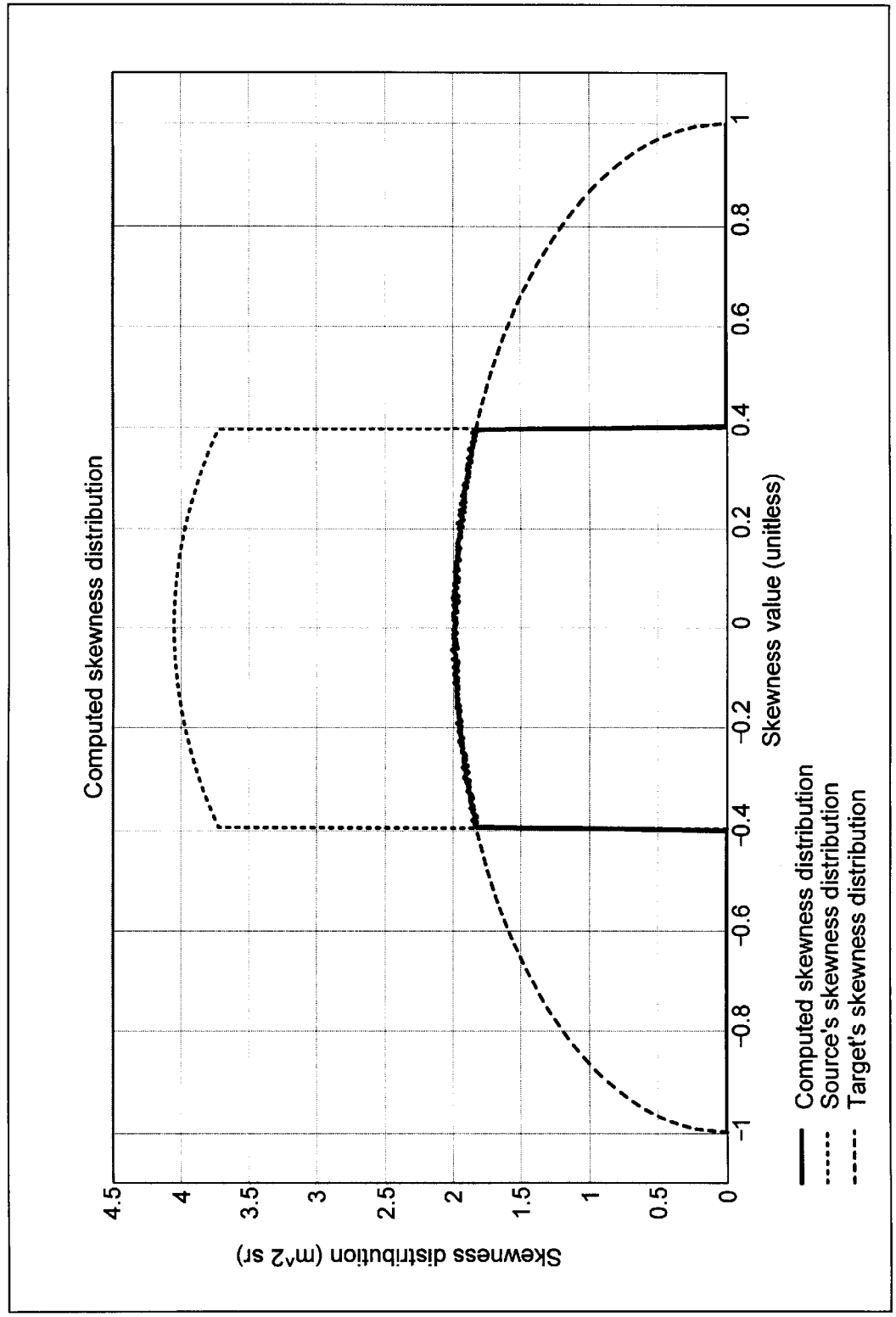
FIG. 29 is a representation of the computed skewness distributions for flux that is transferred to the target area for the unperturbed involute concentrator design disclosed in Appendix E.

Appendix D shows another example of an optimized concentrator design using designated input characteristics. As in FIGS. 16 and 19, FIG. 22 shows the baseline, unperturbed involute concentrator shape in dashed lines, while the optimized shape is shown in solid lines. FIGS. 22 and 23 show the optimized design in the x,z plane and x,y plane respectively with a number of light rays also shown. FIG. 24 is a plot of the ridge tilt angle vs. the normalized profile position for the optimized design disclosed in Appendix D, and FIG. 25 is a plot of the computed skewness distributions for the flux transferred to the target in the optimized design. For this design, a flux-transfer efficiency of about 72.7% was calculated. This is a significant improvement over the baseline nonoptimized, unperturbed involute concentrator design described in Appendix E and shown in FIGS. 26–29. For the unperturbed involute concentrator design, the calculated efficiency was found to be only about 49.3%.

Figure 30:
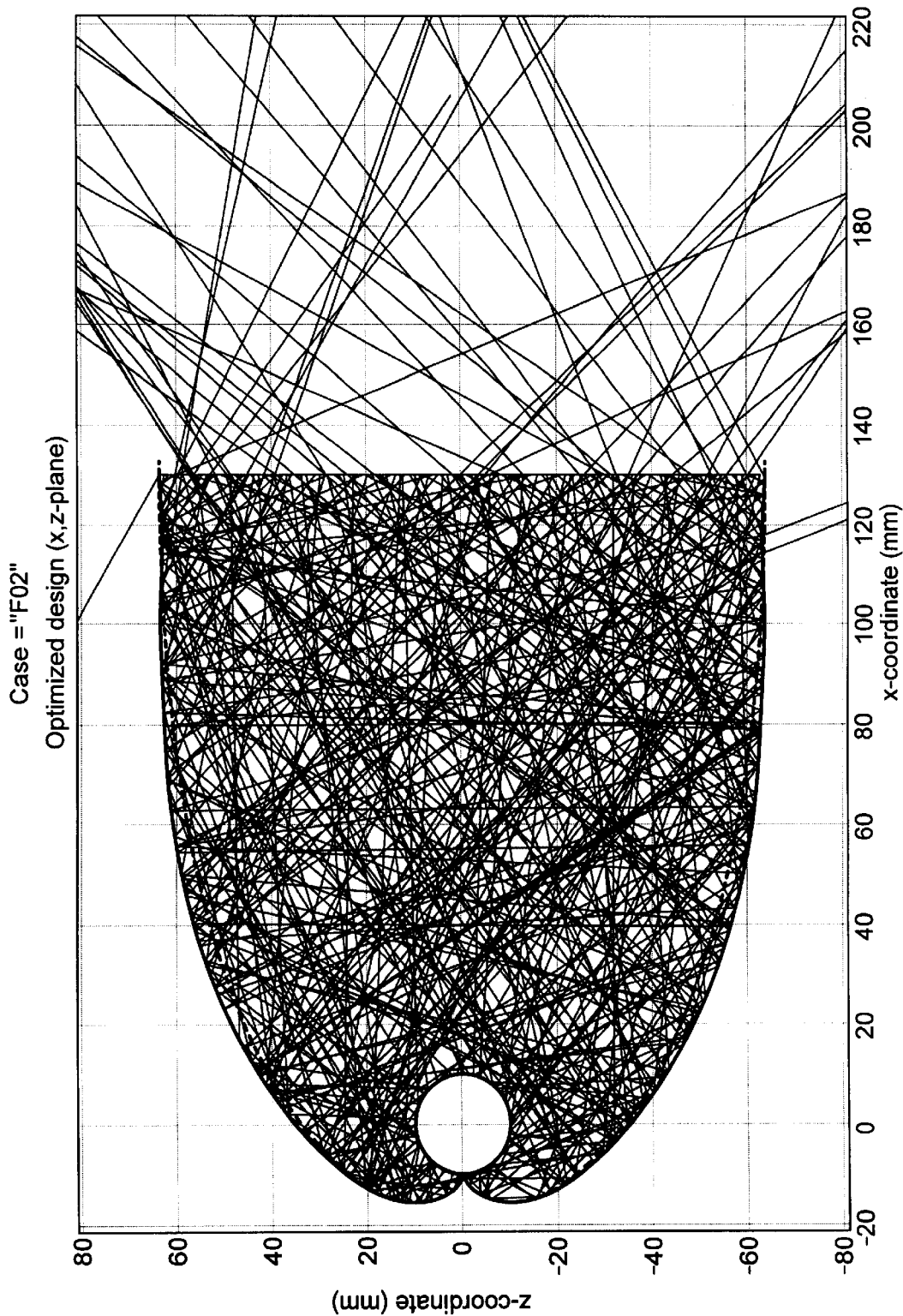
FIG. 30 is a plot showing the optimized design of the solar concentrator described in Appendix F in the x,z plane.
Figure 31:
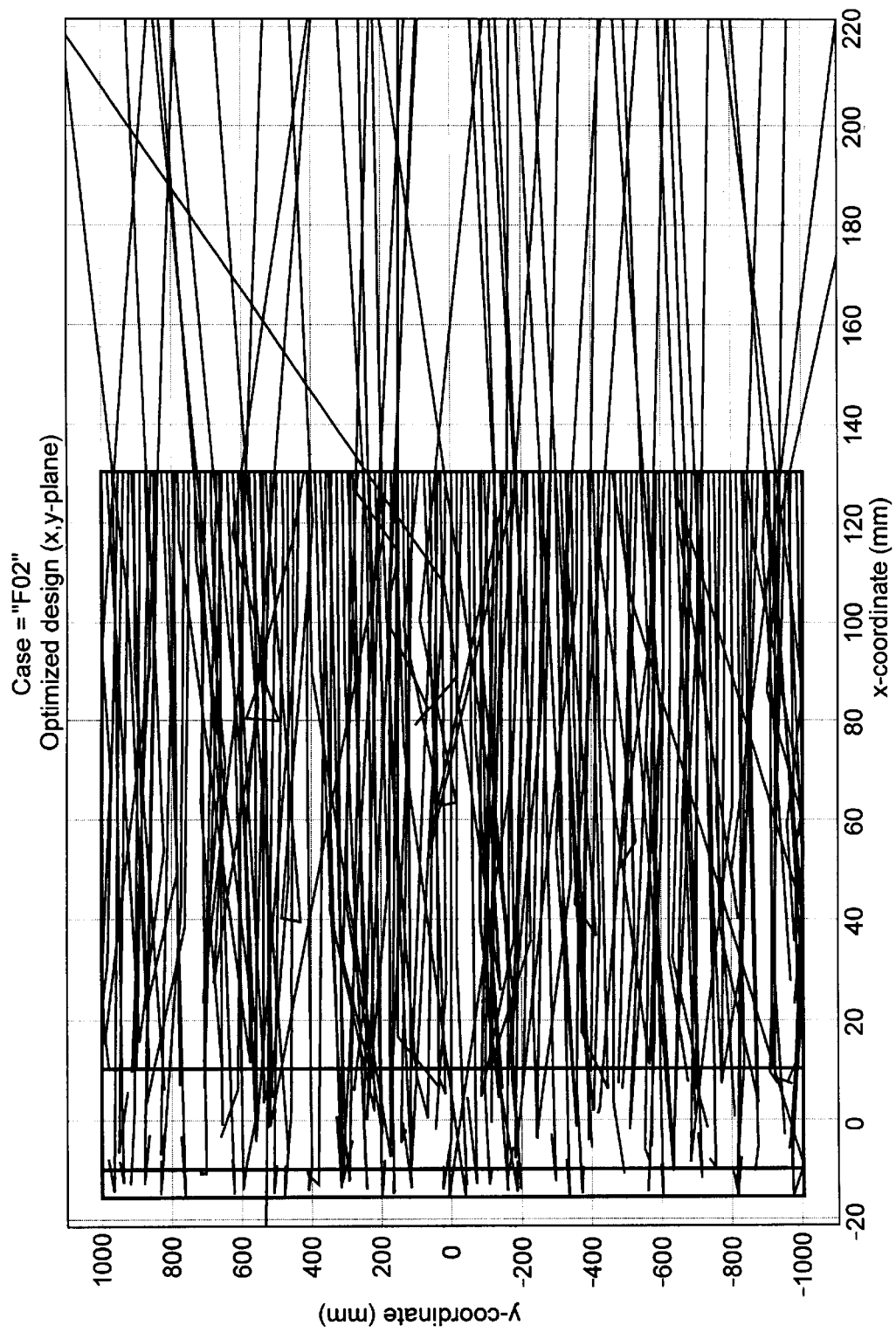
FIG. 31 is a plot showing the optimized design of the solar concentrator described in Appendix F in the x,y plane.
Figure 32:
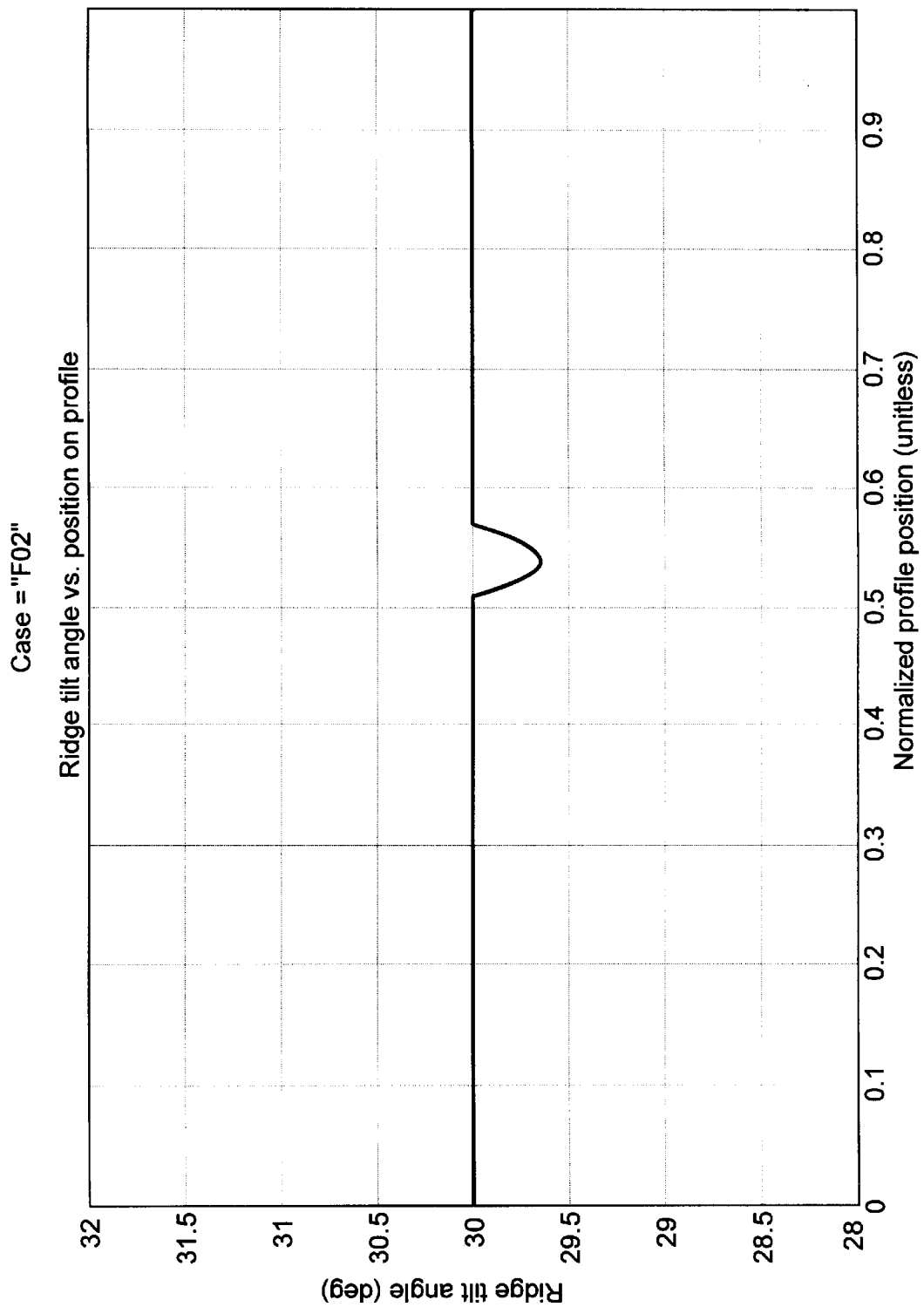
FIG. 32 is a plot showing the ridge tilt angle relative to the normalized profile position for the optimized concentrator design disclosed in Appendix F.
Figure 33:
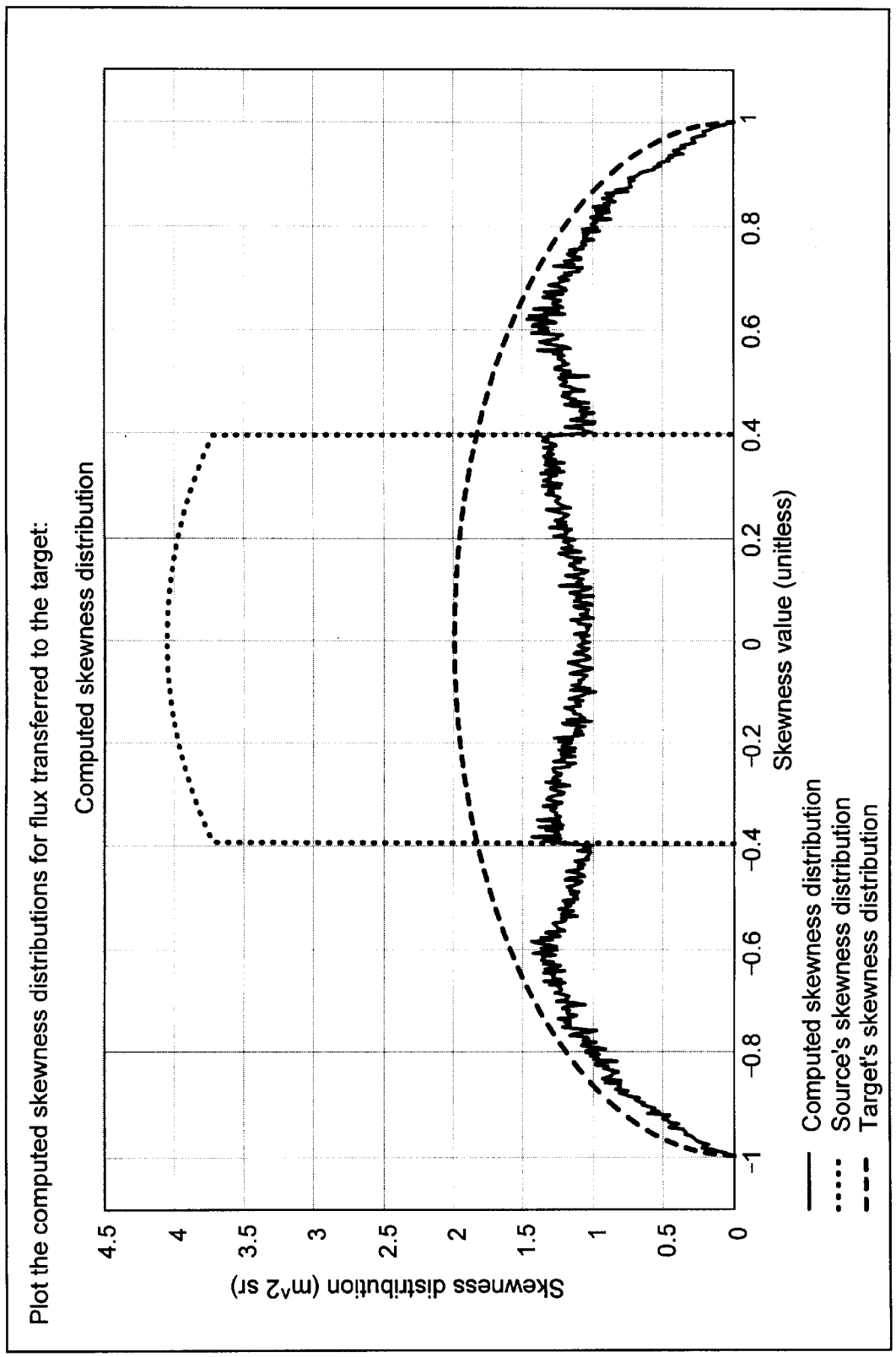
FIG. 33 is a representation of the computed skewness distributions for flux that is transferred to the target area for the optimized concentrator design disclosed in Appendix F.
Figure 34:
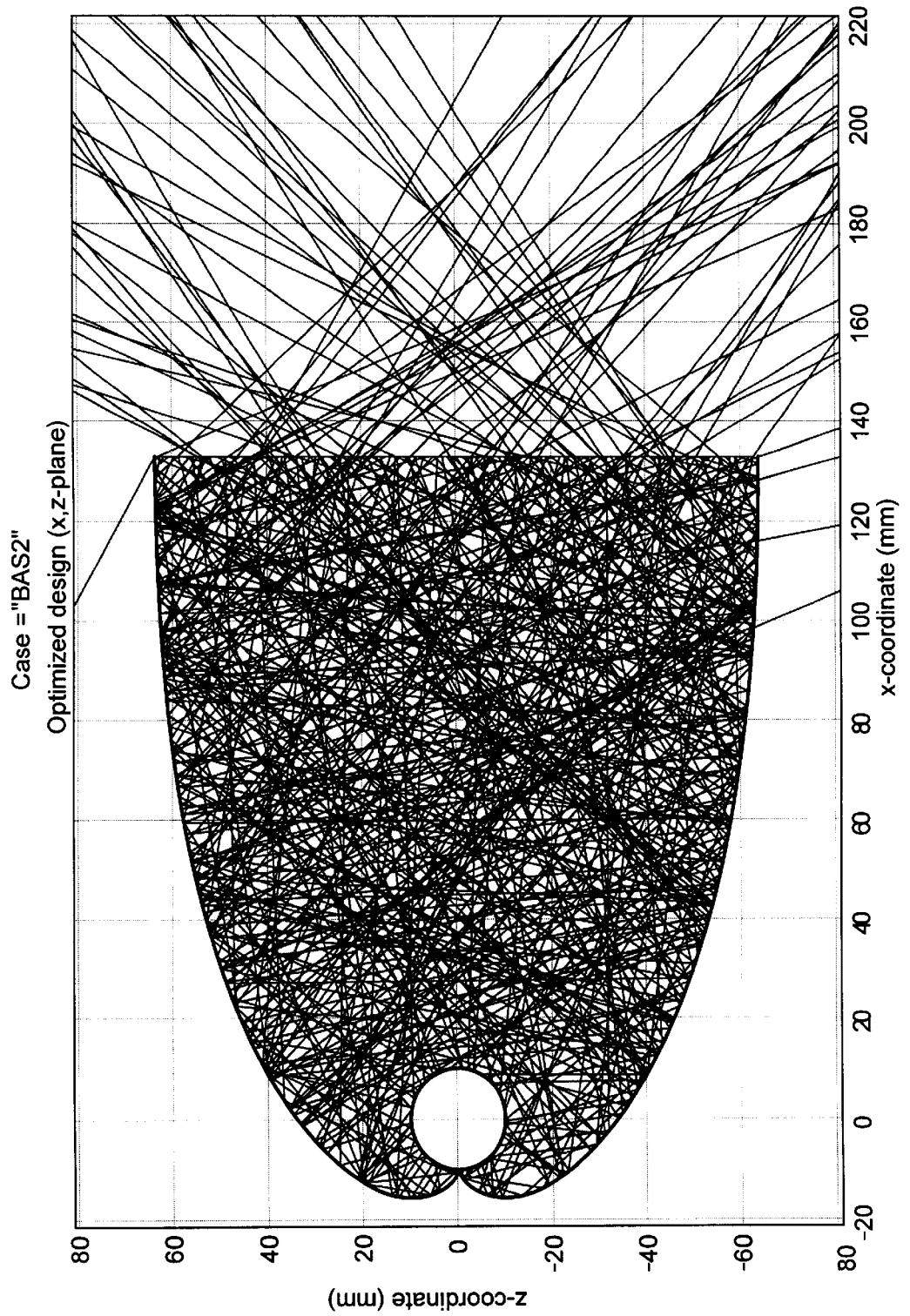
FIG. 34 is a plot showing the unperturbed involute design of the solar concentrator described in Appendix G in the x,z plane.
Figure 35:
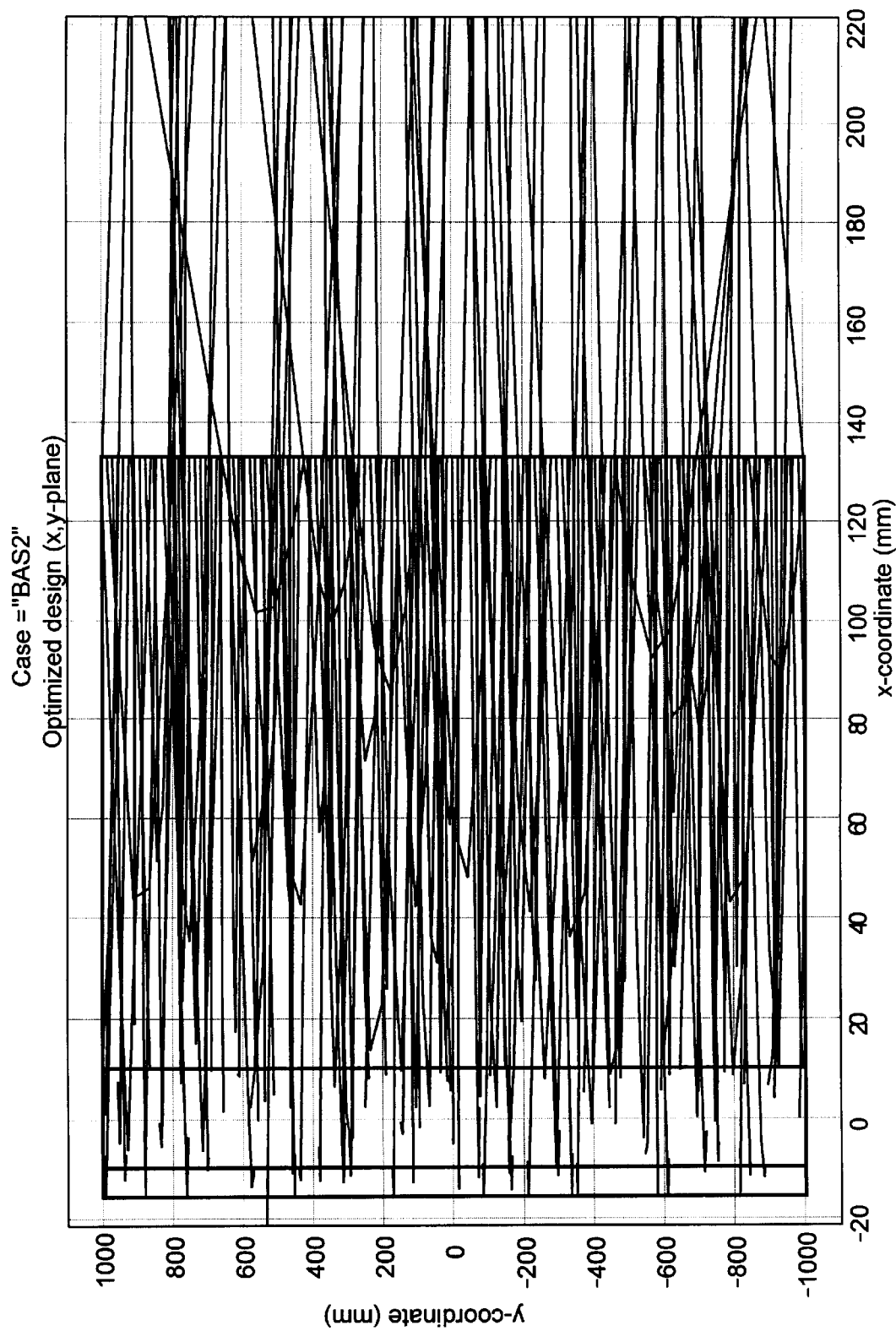
FIG. 35 is a plot showing the unperturbed involute design of the solar concentrator described in Appendix G in the x,y plane.
Figure 36:
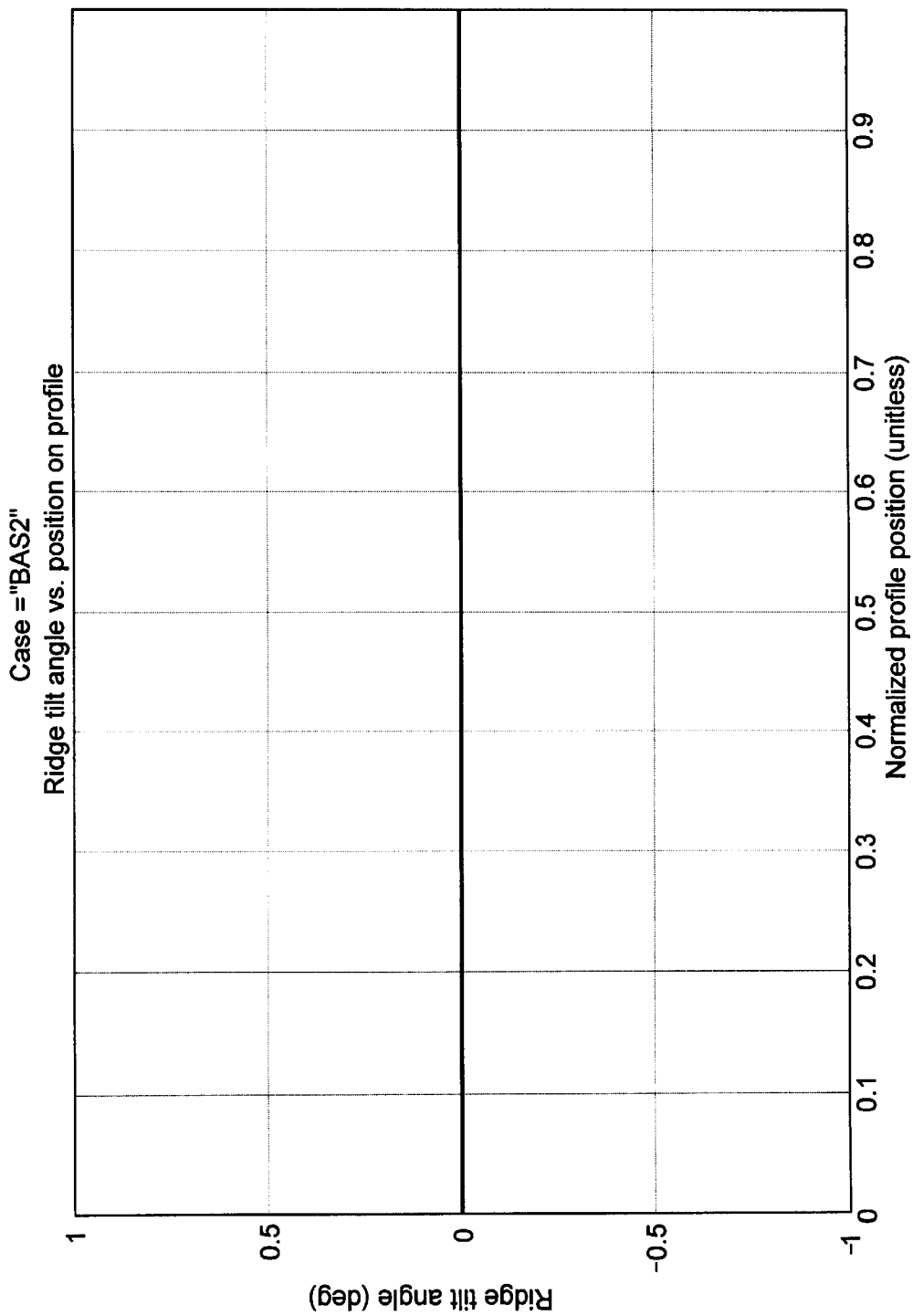
FIG. 36 is a plot showing the ridge tilt angle relative to the normalized profile position for the unperturbed involute concentrator design disclosed in Appendix G.

Appendix F shows yet another example of an optimized concentrator design using designated input characteristics. FIG. 30 shows the baseline, unperturbed involute concentrator shape in dashed lines, while the optimized shape is shown in solid lines. FIGS. 30 and 31 show the optimized design in the x,z plane and x,y plane respectively with a number of light rays also shown. FIG. 32 is a plot of the ridge tilt angle vs. the normalized profile position for the optimized design disclosed in Appendix F, and FIG. 33 is a plot of the computed skewness distributions for the flux transferred to the target in the optimized design. For this design, a flux-transfer efficiency of about 68.4% was calculated. This is a significant improvement over the baseline nonoptimized, unperturbed involute concentrator design described in Appendix G and shown in FIGS. 34–36. Appendix H is a printout of the procedure used with the NICOS software for developing the optimized design shown and analyzed in FIGS. 30–33.

In one preferred embodiment of the invention, it has been determined that the groove angle varies monotonically and almost linearly with the perimeter arc length, with a groove angle of about thirty-one degrees in the region nearest the receiver and about twenty five degrees at the edge of the concentrator.

In another aspect of the invention, we derive the theoretical upper limits, without reference to any particular type of concentrators. We then focus on trough-type or linear systems, which posses a translational invariance along one direction. We show that trough systems are not ideal as stationary concentrators and more stringent upper limits apply.

The annual movement of the earth around the sun in a nearly circular orbit combined by the daily rotation around its axis which is inclined by the angle δ, to the plane of its orbit (the ecliptic) accounts for an apparent movement of the sun in an earth-based coordinate system. We follow the same notation and use a coordinate system with one axis oriented horizontally East to West. The second axis points North to South, parallel to the axis of the earth, that is inclined with respect to the local horizontal direction by an angle equal to the latitude. The third axis, perpendicular to the other two, points toward the sun at noon, at equinox. This coordinate system corresponds to the common orientation of a stationary concentrator. A unit vector pointing in a certain direction is represented by its component $k_E$ along the E-W axis and its component $k_N$ along the N-S axis. The third component, $k_H$ is known from normalization. Area elements in the $k_E$, $k_N$ space correspond to projected solar angle and can be used to assess concentration.

The apparent direction of the sun is given to a very good approximation by $$k_N = -\sin \delta_o \cos(\omega_y t)$$
$$k_E = -\sqrt{1-k_N^2} \sin(\omega_d(t+T)) \quad (60)$$

where $\omega_y = 2\pi/\text{year}$ describes the yearly angular orbital movement, $\omega_d = 2\pi/\text{day}$ describes the angular daily rotation and t the time since equinox. The correction T comprises a constant offset, the time difference between nearest local noon and equinox, as well as time-dependent correction known as the equation of time, which is due to the deviation of the earth's orbit from a circular path. This correction varies slowly in the course of one year by a maximum of ±15 minutes. Its effects are negligible for the purpose of this work. The declination angle $\delta_o = 23.45$ degrees is the angle between the plane of the yearly orbit, the ecliptic, and the polar axis of rotation of the earth.

The movement of the sun is visualized in FIG. 47. To a good approximation, the sun moves in the course of a day along a straight line $k_N \approx \text{const.}$ parallel to the W-E axis. In the course of a year, the daily path oscillates between a maximum value at summer solstice and a minimum at winter solstice. This is indicated by the parallel lines which describe 36 sample days at equal time spacing over one year.

First we note that a surface oriented parallel to the axes chosen receives solar radiation only from inside the band $$-\sin(\delta_o + \alpha_3) \leq k_N \leq \sin(\delta_o + \alpha_3) \quad (61)$$

Here $\alpha_3 = 4.7$ mrad is the half-angle subtended by the sun. It adds to the declination in order to account for rays from the rim of the solar disk.

A stationary concentrator which accepts radiation only from this band can achieve a maximum concentration, without rejecting any radiation, equal to the ratio of the area of the entire circle to the area of the band given by Eq. (61), that is $$C_{\max} = \frac{\pi}{2(\delta_o + \alpha_3) + \sin(2\delta_o + 2\alpha_3)} \approx 2.0 \quad (62)$$

The value in Eq. (62) applies for an ideal device required to accept all rays. If we analyze FIG. 44, it is apparent that the radiation is not uniformly distributed within the band described by Eq. (61). The solar path spends more time near the extremes than in the center. We define the average relative radiance from a certain direction as the ratio of the radiance received from this direction to that constant radiance which we would receive from the same direction if the same power would be homogeneously distributed over all regions of the celestial sphere. This relative radiance is proportional to:

$$B^P(k_N, k_E) \sim \frac{1}{\sqrt{\sin^2\delta_o - k_N^2}} = B^P(k_N) \quad (63)$$

where $d_t$ denotes the time derivative and P the radiative power. In the numerator $\omega_y, \omega_d$ describes the frequency a region is visited, the root describes the intensity of a point source, proportional to the cosine of the incidence angle, or the ratio of solid angle to projected solid angle. The denominator accounts for the time the sun spends in an interval $dk_N dk_E$. Substituting the time derivatives $$|d_t k_N| = \sin \delta_o \omega_y \sqrt{1 - \left(\frac{k_N}{\sin \delta_o}\right)^2} \quad (64)$$

$$|d_t k_E| = \omega_d \sqrt{1 - k_N^2} \sqrt{1 - \frac{k_E^2}{1-k_N^2}} = \omega_d \sqrt{1 - k_E^2 - k_N^2} \quad (65)$$

into Eq. (63) yields for the relative intensity $$B^P(k_N, k_E) \sim \frac{1}{\sqrt{\sin^2\delta_o - k_N^2}} = B^P(k_N). \quad (66)$$

In Eq. (65) we neglected the term proportional to because $w_y$ because $\omega_y << \omega_d$. Note that the radiance distribution does not depend on $k_E$; it is constant along directions of equal latitude. Consequently we dropped the dependence on $k_E$. The decrease in speed in the W-E direction in the morning and evening is compensated by the cosine effect, whereas the decrease in speed in the S-N direction at the solstices is not. Equation (66) is strictly valid only in the limit of negligible size of the solar disk. This is a good approximation everywhere except at $k_N = \sin \delta_o$, where for a point sun the relative radiance would be infinite. To account for the finite size of the sun, the relative radiance needs to be averaged over the solar disk:

$$B(k_N) = \frac{2}{\pi} \int_{x=-1}^{x=1} \sqrt{1-x^2}\, B^p\!\left(k_N + x\alpha_3 \sqrt{1-k_N^2}\right) dx \quad (67)$$

The first square root is the cord of the solar disc, the second describes the distortion due to the projection. Accounting for the finite size of the sun keeps the relative radiance distribution finite. The relative radiance distribution as a function of $k_N$ is shown in FIG. 45. The radiance around the center is approximately a factor of $2/\pi$ of its average value over the entire band.

By rejecting lower density radiation a device can reach higher concentration values than $C_{max}$ albeit at the price of reduced collection efficiency. A complete description must specify a limit curve of efficiency versus concentration such that no higher efficiency for given concentration nor higher concentration for given collection efficiency can be reached. Similar situations are frequently encountered in analyzing theoretical limits for optical devices. Assume radiation from the sun is rejected during a certain fraction of the year, centered around the equinoxes. Then the collection efficiency is reduced by the same factor. However, the concentrator need not accept radiation from the center of the band, therefore the concentration is higher.

Accepting all radiation above a certain brightness and none below leads to an optimal device in the sense that no higher efficiency at the same concentration nor higher concentration at the same efficiency are possible. This can be argued by making the contrary assumption: a concentrator that accepts some radiation of brightness $B_1$ and not all radiation of brightness $B_2 > B_1$. Then modifying the concentrator by diminishing the amount of radiation accepted at $B_1$ and increasing that of $B_2$ by the same amount increases the concentration without affecting the collection efficiency. Increasing the accepted phase space around $B_2$ by the same amount the phase space at $B_1$ is reduced increases the collection efficiency without changing the concentration.

In FIG. 46 we show the efficiency versus concentration for an ideal stationary concentrator, calculated by assuming that increasingly wide bands of phase space are excluded by increasing the brightness limit for acceptance. With the normalization used here, namely that the average brightness is unity, the peak value of the brightness corresponds to the maximum concentration that can be reached in the limit of zero collection efficiency. As FIG. 3 indicates this value is around 12 for an ideal stationary concentrator.

Note that the concentration derived this way is an average value, averaged over all times. In practice the device will have zero efficiency over two equal periods centered around the solstices and ideally unit efficiency during the rest of the year. We may therefore justify relating the radiation collected to the operation time only. This is visualized in FIG. 47 showing significantly higher concentrations.

All conclusions in this section apply to the direct radiation only. We neglected any scattering or absorption in the atmosphere. In reality the solar radiation on earth can often be adequately modeled as a direct part and a totally diffuse part, where the fractions depend on the particular climate. This work then applies to the direct part only. The diffuse part cannot be concentrated. The fraction of the diffuse part that is collected is exactly equal to the fraction of phase space accepted. We also neglected reflectivity losses; therefore, collection efficiency here is used synonymously to optical throughput. The distribution in FIG. 47 is strictly valid only at the equator. At higher latitudes it may happen that the edges of the solar band lie outside the visible horizon for a concentrator oriented parallel to the polar axis, i.e. inclined at the latitude angle.

Based on the band shaped structure of the phase space, or on the essentially one dimensional apparent motion of the sun, solar collectors, which have a translational symmetry, have been built and actually are the most successful energy producers today. This means that there is one spatial direction, parallel to one of the tangents of the reflector at every location. Consequently the component of the radiation in that particular direction is not changed by the reflection independent of the incidence point. By using the same symmetry for the absorber, usually a tube or a fin, the entire problem is two-dimensional. For these reasons trough-type concentrators are sometimes also called 2-D devices. One would hope to have a concentrator matched to the phase space presented by the solar geometry.

Unfortunately this is not true. Assume that a trough solar collector is oriented with the translational axis in the E-W direction. Assume further that this concentrator has been designed to accept all rays incident within $-\theta$ to $\theta$ in a projection onto the meridional plane. In terms of the coordinate system used here, rays are accepted if and only if $$\left|\frac{k_N}{k_H}\right| \le \tan\theta. \quad (68)$$

Using the normalization of the direction vector $$k_N^2 + k_W^2 + k_H^2 = 1, \quad (69)$$

allows to eliminate $k_H$. This leads to $$\frac{k_N^2}{\sin^2\theta} + k_E^2 \le 1. \quad (70)$$

This represents an ellipse with the N-S axis equal to $\sin\theta$ and the E-W axis equal to unity.

The derivation above shows that for a trough-type concentrator of any cross section the acceptance function depends only on the ratio $k_N/k_H$. Any two rays which have the same value for this ratio, but may differ in the third component, along the translation axis, are optically indistinguishable. In the projection onto the aperture, therefore the isoacceptance lines are ellipses with the axis, parallel to the translational axis, equal to unity. In FIG. 44 we have indicated the region accepted by an ideal trough-type CPC of 35 degrees acceptance angle by the dotted ellipse. One caveat needs to be added in this context. We have ignored the possible dependence of absorptivity at the absorber and of the reflectivity on the true (not projected) incidence angle, in the spirit of idealization. This effect is small in most practical systems.

Based on the fact that rough collectors have isoacceptance lines defined by Eq. (70) we calculate the solar power $BT(\sin\theta)$ between two isoacceptance ellipses separated by an interval $d\sin\theta$ $$B^T(\sin\theta) = \frac{dP}{d\sin\theta} \quad (71)$$

$$= \int_{k_g=-1}^{k_g=1} \sqrt{1-k_E^2} \, B\!\left(k_N = \sin\theta\sqrt{1-k_E^2}, k_E\right) dk_E$$

This is the one-dimensional distribution appropriate to evaluate the performance of ideal trough-type systems. It is visualized in FIG. 48.

First we note that the distribution is nowhere zero. This signifies that trough-type collectors cannot achieve any concentration without sacrificing collection efficiency. However, the distribution is not uniform. Thus rejecting radiation where the density is below some limit does allow concentration with stationary trough-type concentrators for the price of sacrificing collection efficiency.

We have calculated the upper limit for the characteristic curve of trough-type concentrators by calculating the collection efficiency and the phase space accepted if radiation is accepted only if the brightness exceeds a predefined limit. This curve is shown in FIG. 49. For comparison we show as dotted line the upper limit of an ideal (non trough) concentrator as plotted in FIG. 46. Again the normalization is such that the average value is unity. Therefore the peak value corresponds to the highest possible concentration reachable in the limit of zero collection efficiency. For an ideal stationary trough-type concentrator this value is roughly 5.

Note that the performance of the trough-type concentrator is significantly lower than the general upper limit. This shows that trough-type collectors are not well matched to band shaped phase space. For stationary concentrators this has been known, and the performance of trough type collectors as stationary concentrators has been derived. Here we have shown the basic reasons the translational invariance of trough collectors does not allow them to approach the ideal upper limits.

The apparent motion of the sun occupies only 50% of the sky, in appropriate phase space measure, so that concentration by a factor of 2 should be achievable by stationary concentrators without sacrificing collection efficiency. Furthermore the apparent position of the sun in the sky is not uniformly distributed. This fact allows even higher concentration ratios with stationary collectors designed to operate only for a part of the year, around the solstices.

A light-transmission device in either linear (trough-like) or three dimensional (such as, spherical) symmetry is used as a passive (non-focussed, non-tracking) solar collector or as a non-imaging distributor of radiation. A pattern of corrugations, or other broken symmetries, in such geometries provides a wider acceptance angle of collection and a larger solid angle of radiation. The corrugations may be smooth or angular, and can be optimized for configurations.

Referring to FIG. 44 the path of travel of the sun can be represented in phase space by two well known components, namely the direction vectors $k_N$ and $k_E$ (or $_w$). The daily path is virtually a straight line, and in the course of the year, the path of travel oscillates between two extremes $k_N$. The paths for 36 days are shown at equal intervals over the year. The dotted ellipse describes the accepted region of the trough-type prior art CPC (compound parabolic concentrator) of 35° acceptance angle. As noted hereinbefore, the performance of the trough-type concentrator is significantly lower than the general upper limit available. This shows that trough-type collectors are not well matched to the illustrated band shaped phase space. For stationary concentrators this has been known, and the performance of trough-type collectors as stationary concentrators has been derived. Here we have shown the basic reasons the translational invariance of trough collectors does not allow them to approach the ideal upper limits.

The apparent motion of the sun occupies only 50% of the sky, in appropriate phase space measure, so that concentration by a factor of two should be achievable by stationary concentrators without sacrificing collection efficiency. Furthermore the apparent position of the sun in the sky is not uniformly distributed. This fact allows even higher concentration ratios with stationary collectors designed to operate only for a part of the year, around the solstices.

In order to improve performance over the prior art, a light-transmission device in either linear (trough-like) or three dimensional (such as, spherical) symmetry is used as a passive (non-focussed, non-tracking) solar collector or as a non-imaging distributor of radiation. A pattern of corrugations, or other broken symmetries, in such geometry's provides a wider acceptance angle of collection and a larger solid angle of radiation. The corrugations may be smooth or angular, and can be optimized for configurations.

In summary, we have shown that any translationally invariant trough type concentrator has an angular acceptance that does not match the apparent solar motion, and that the performance of collectors can be improved by breaking up selected aspects of symmetry-imposed constraints. Therefore, breaking of symmetry can be applied to two and three dimensional structures to improve performance. Several examples of ways to break up such symmetries includes forming straight line or planar discontinuities (sharp folds which form discontinuities) or smooth discontinuities, such as sinusoidal changes in amplitude and frequency.

While preferred embodiments of the invention have been shown and described, it will be clear to those skilled in the art that various changes and modifications can be made without departing from the invention in its broader aspects as set forth in the claims provided hereinafter.

What is claimed is:

1. A method of improving performance of a reflector surface, comprising the steps of:

providing a trough-shaped solar reflector shape extending along a longitudinal axis; and imposing a variable broken symmetry structure upon the solar reflector shape, the broken symmetry structure defining a non-elliptical phase space acceptance range for the reflector shape and thereby causing a substantially band-like shape in phase space for the acceptance zone for the reflector shape over a solar year.

* * * * *